United States Patent
Maki

(10) Patent No.: US 9,022,486 B2
(45) Date of Patent: May 5, 2015

(54) VEHICLE BRAKE DEVICE

(75) Inventor: Kazuya Maki, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 154 days.

(21) Appl. No.: 13/638,443

(22) PCT Filed: Mar. 30, 2011

(86) PCT No.: PCT/JP2011/058063
§ 371 (c)(1),
(2), (4) Date: Sep. 28, 2012

(87) PCT Pub. No.: WO2011/125759
PCT Pub. Date: Oct. 13, 2011

(65) Prior Publication Data
US 2013/0020859 A1     Jan. 24, 2013

(30) Foreign Application Priority Data

Mar. 31, 2010  (JP) .................................. 2010-083347

(51) Int. Cl.
*B60T 13/74* (2006.01)
*B60T 1/10* (2006.01)
(Continued)

(52) U.S. Cl.
CPC . *B60T 1/10* (2013.01); *B60K 6/445* (2013.01); *B60T 7/042* (2013.01); *B60T 8/38* (2013.01); *B60T 8/4872* (2013.01); *B60T 13/57* (2013.01);
(Continued)

(58) Field of Classification Search
USPC ............... 303/3, 4, 11, 12, 113.3, 113.4, 152, 303/157, 158
See application file for complete search history.

(56) References Cited

U.S. PATENT DOCUMENTS

2005/0269875 A1* 12/2005 Maki et al. .................... 303/152
2007/0228812 A1* 10/2007 Kokubo et al. .................... 303/3
2013/0020858 A1   1/2013 Maki et al.

FOREIGN PATENT DOCUMENTS

CN         1706700 A    12/2005
CN       101274623 A    10/2008
(Continued)

OTHER PUBLICATIONS

International Search Report (PCT/ISA/210) issued on Jul. 5, 2011, by the Japanese Patent Office as the International Searching Authority for International Application No. PCT/JP2011/058063.

*Primary Examiner* — Pamela Rodriguez
(74) *Attorney, Agent, or Firm* — Buchanan Ingersoll & Rooney PC

(57) ABSTRACT

In a vehicle brake device, when a brake pedal is depressed normally, high regeneration efficiency and high fuel efficiency can be achieved by positively utilizing the regenerative braking force, and early applying of basic hydraulic braking force can be achieved when the brake pedal is suddenly depressed. The vehicle brake device includes an operation force transmitting mechanism on a connecting member between the brake pedal and the master cylinder piston and having first and second rods and a spring member biasing the first and second rods in a direction separating both rods from each other. The operation force transmitting mechanism includes an inner space between both rods and a communication passage allowing communication of the inner space with the exterior. The communication passage restricts the outflow of fluid in the inner space upon an emergency brake pedal depression and allows the outflow thereof upon non-emergency brake pedal depression.

11 Claims, 13 Drawing Sheets

(51) Int. Cl.

| | | |
|---|---|---|
| *B60K 6/445* | (2007.10) | |
| *B60T 7/04* | (2006.01) | |
| *B60T 8/38* | (2006.01) | |
| *B60T 8/48* | (2006.01) | |
| *B60T 13/57* | (2006.01) | |
| *B60T 13/68* | (2006.01) | |
| *B60W 10/08* | (2006.01) | |
| *B60W 10/188* | (2012.01) | |
| *B60W 30/18* | (2012.01) | |
| *B60T 8/24* | (2006.01) | |
| *B60T 8/32* | (2006.01) | |
| *B60W 20/00* | (2006.01) | |

(52) U.S. Cl.
CPC ........... *B60T 13/686* (2013.01); *B60T 2201/03* (2013.01); *B60T 2270/604* (2013.01); *B60W 10/08* (2013.01); *B60W 10/188* (2013.01); *B60W 20/00* (2013.01); *B60W 30/18127* (2013.01); *Y02T 10/6239* (2013.01); *B60T 8/248* (2013.01); *B60T 8/3275* (2013.01)

(56) References Cited

FOREIGN PATENT DOCUMENTS

| | | |
|---|---|---|
| JP | 5-262210 A | 10/1993 |
| JP | 7-149216 A | 6/1995 |
| JP | 2006-143099 A | 6/2006 |
| JP | 2010-025150 A | 2/2010 |
| JP | 4415379 B2 | 2/2010 |

* cited by examiner

VEHICLE BRAKE DEVICE

TECHNICAL FIELD

This invention relates to a vehicle brake device achieving a target braking force to be applied to a vehicle in response to a brake operation condition by hydraulic braking force generated by a hydraulic brake device and regenerative braking force generated by a regeneration brake device.

BACKGROUND OF THE TECHNOLOGY

Conventionally, as an example of the vehicle brake device, a vehicle brake device has been known, which has a hydraulic brake device generating a basic hydraulic braking force in response to a basic hydraulic pressure at each vehicle wheel, by generating the basic hydraulic pressure at a master cylinder in response to the brake pedal depression force and applying the generated basic hydraulic pressure directly to each wheel cylinder of each vehicle wheel which is hydraulically connected to the master cylinder through a hydraulic passage in which a hydraulic pressure control valve is interposed and a regeneration brake device generating a regenerative braking force at any of the vehicle wheels. The brake device applies vehicle braking force to the vehicle in response to the brake pedal operation condition based on the basic hydraulic braking force and the regenerative braking force by cooperation between the hydraulic brake device and the regeneration brake device.

This type of brake device for vehicle is provided with a basic hydraulic braking force generation restricting means which is provided with a first rod formed at one of the connecting members provided between the brake pedal and the master cylinder for connecting therebetween, the first rod being a brake pedal side portion of the connecting members, a second rod being a master cylinder side portion of the connecting members and a tip end thereof being slidably engaged with a tip end of the first rod and a biasing member disposed between the first and the second rods and biasing the first and the second rods in a direction where both rods are separating from each other, whereby upon brake pedal depression operation, the generation of the basic hydraulic braking force is restricted while the first rod moves from the pedal depression starting position, in which the brake pedal is under the depression start condition, to the contacting position with the second rod and such restriction is released when the first rod moves beyond the contacting position with the second rod.

The contacting position of the first rod with the second rod of the vehicle brake device is designed to be provided based on the maximum regenerative braking force that can be generated by the regeneration brake device and at the same time designed to be provided so that the vehicle braking force corresponding to the brake pedal operation condition is applied to the vehicle only by the regenerative braking force generated by the regeneration brake device while the first rod is positioned between the pedal depression start position and the contacting position and the vehicle braking force corresponding to the brake pedal operation condition is applied to the vehicle both by the basic hydraulic braking force generated by the hydraulic brake device and the regenerative braking force generated by the regeneration brake device after the first rod positioned beyond the contacting position.

DOCUMENT LIST OF STATE OF ART

Patent Document

Patent Document 1: Patent Publication No. 4415379

DISCLOSURE OF INVENTION

Problems to be Solved

However, according to the vehicle brake device disclosed in the above Patent Document 1, high regeneration efficiency, in other words, high fuel efficiency can be attained by positively utilizing the regenerative braking force under a non-emergency brake pedal depression in which the pedal is not suddenly depressed (for example, brake pedal is depressed with a normal braking operation speed). However, on the other hand, there is a demand that the basic hydraulic braking force is applied as early as possible rather than attaining the high regeneration efficiency and high fuel efficiency upon an emergency brake pedal depression operation.

The present invention was made in consideration with the above problems and the object of the invention is, in a vehicle brake device, to enhance the compatibility between the attainment of high regeneration efficiency and high fuel efficiency by positively utilizing the regenerative braking force when the brake pedal is depressed under non-emergency braking operation and achieving of applying basic hydraulic braking force as early as possible upon an emergency brake pedal depression operation.

Means for Solving the Problem

A first aspect of the invention made for solving the above problem is characterized in that the vehicle brake device comprises a hydraulic brake device for generating a basic hydraulic braking force corresponding to a basic hydraulic pressure at each vehicle wheel by generating the basic hydraulic pressure in response to a brake pedal depression in a master cylinder and by directly supplying the generated basic hydraulic pressure to said each vehicle wheel connected to the master cylinder via a hydraulic passage in which a hydraulic control valve is disposed and a regeneration brake device for generating a regenerative braking force at any of said each vehicle wheel, wherein a vehicle braking force corresponding to a brake pedal operation condition based on the basic hydraulic braking force and the regenerative braking force by cooperation between the hydraulic brake device and the regeneration brake device and characterized in that the vehicle brake device includes a connecting mechanism for cooperatively connecting the brake pedal and the master cylinder and having a first rod connected to the brake pedal, a second rod connected to the master cylinder and having an inner space formed with a tip end portion of the first rod and filled with fluid, the second rod being slidably engaged with the tip end portion of the first rod by variably changing the volume of the inner space and a biasing member disposed between the first rod and the second rod and biasing the first and the second rods in a direction where the volume of the inner space increases and a communication passage for establishing communication between the inside and outside of the inner space wherein upon an emergency depression of the brake pedal, outflow of the fluid in the inner space is restricted and upon a non-emergency depression of the brake pedal, the outflow of the fluid in the inner space is not restricted and wherein the generation of the basic hydraulic braking force is restricted under a condition that the second rod is slidably moving relative to the first rod and the generation restriction of the basic hydraulic braking force is released under a condition that the second rod is slidably moving together with the first rod.

A second aspect of the invention is characterized in that in the vehicle brake device the communication passage is formed by an orifice.

A third aspect of the invention is characterized in that in the vehicle brake device the communication passage is formed by the orifice which is formed by a gap between the first rod and the second rod.

A fourth aspect of the invention is characterized in that in the vehicle brake device at least one of the tip end portions of the first and the second rods is formed with a cylindrical portion having a bottom at one end and an opening at a tip end thereof and the other of the tip end portions slidably moves within the cylindrical portion and wherein the inner space is formed inside of the cylindrical portion.

A fifth aspect of the invention is characterized in that in the vehicle brake device the communication passage is the orifice which penetrates through a side wall of the cylindrical portion.

A sixth aspect of the invention is characterized in that in the vehicle brake device the generation of the basic hydraulic braking force is restricted by the slidable movement of the second rod relative to the first rod during a period of time from the time when the depression of the brake pedal starts until the time when the tip end portion in the cylindrical portion contacts with the bottom of the cylindrical portion upon the non-emergency depression of the brake pedal, and wherein the generation restriction of the basic hydraulic braking force is released when the second rod pushes the first rod by means of the fluid which is compressed in the inner space after the depression of the brake pedal started and before the tip end portion in the cylindrical portion contacts with the bottom of the cylindrical portion upon the emergency depression of the brake pedal.

A seventh aspect of the invention is characterized in that in the vehicle brake device wherein the depression position of the brake pedal where the tip end portion in the cylindrical portion contacts with the bottom of the cylindrical portion is set based on the maximum generative braking force that can be generated by the regeneration brake device.

An eighth aspect of the invention is characterized in that the vehicle brake device further comprises a control valve for opening or closing a fluid passage which is connected to the communication passage; and a detecting means for detecting the emergency depression of the brake pedal wherein the control valve closes the communication passage when the detecting means detects the emergency depression and opens the communication passage when the detecting means does not detect the emergency depression.

A ninth aspect of the invention is characterized in that the vehicle brake device is provided with a brake assisting device which is operated under a condition that the second rod being slidably moving together with the first rod upon emergency depression of the brake pedal.

The Effects of the Invention

According to the first aspect of the invention, since the outflow of fluid in the inner space formed between the first rod which is connected to the brake pedal and the second rod which is slidably engaged with the first rod is not restricted by the communication passage upon a non-emergency depression of the brake pedal. Under this state, the volume of fluid in the inner space becomes smaller, but the fluid therein is substantially not compressed and accordingly, the second rod is slidably moving relative to the first rod. Thus the generation of the basic hydraulic braking force is restricted under this condition. When the operator of the vehicle depresses the brake pedal under non-emergency braking operation, the basic hydraulic braking force is compulsively restricted to a predetermined value or less than the value. Under this situation, in order to achieve the vehicle braking force corresponding to the brake operation condition, the regeneration brake device cooperates with the hydraulic brake device and supplements the deficiency of the basic hydraulic braking force relative to the vehicle braking force by supplying the regenerative braking force. Accordingly, under the non-emergency brake pedal depression, the high regeneration efficiency or high fuel efficiency can be achieved by positively utilizing the regenerative braking force.

On the other hand, upon an emergency depression of the brake pedal, the outflow of the fluid in the inner space is restricted by the communication passage. Under this situation, for example, since the compressed air is produced in the inner space, the first rod pushes the second rod by means of the compressed air and the second rod is under a condition of movement with the first rod. Under this situation the generation restriction of the basic hydraulic braking force is released. Due to this release of restriction, when the operator of the vehicle suddenly depresses the brake pedal, the basic hydraulic braking force can be positively generated. During this period of time, the regeneration brake device supplements the deficient amount of the basic hydraulic braking force relative to the necessary vehicle braking force with the regenerative braking force by the cooperation between the hydraulic brake device and the regeneration brake device to obtain the vehicle braking force corresponding to the brake operation condition. Accordingly, the early application of the basic hydraulic braking force can be performed in priority to attainment of high regeneration efficiency and high fuel efficiency upon an emergency depression of the brake pedal.

As explained above, according to the vehicle brake device of the invention, high regeneration efficiency and high fuel efficiency can be achieved by positively utilizing the regenerative braking force upon non-emergency depression of the brake pedal and at the same time an early application of the basic hydraulic braking force can be attained upon the emergency depression of the brake pedal.

According to the second aspect of the invention, the communication passage is formed by an orifice. By a simple structure, the outflow of fluid in the inner space can be throttled.

According to the third aspect of the invention, the orifice is formed by a gap between the first rod and the second rod. Accordingly, by a simple and low-cost structure, the outflow of fluid from the inner space can be throttled.

According to the fourth aspect of the invention at least one of the tip end portions of the first and the second rods is formed with a cylindrical portion having a bottom at one end and an opening at a tip end thereof and the other of the tip end portions slidably moves within the cylindrical portion and wherein the inner space is formed inside of the cylindrical portion. By this structure, the compressed air can be produced in the inner space upon an emergency depression of the brake pedal with an easy and simple structure.

According to the fifth aspect of the invention, the communication passage is formed by an orifice which penetrates through the side wall of the cylindrical portion. Thus, the orifice can be relatively easily machined with accurately formed fluid passage cross section area. The air in the inner space can flow out through the communication passage before the entry/exit port of the communication passage formed on the outer side cylindrical portion (or inner side cylindrical portion) is closed by the inner side cylindrical portion (or the outer side cylindrical portion). Further, after the entry/exit port of the communication passage formed on the outer side cylindrical portion (or inner side cylindrical portion) is closed by the inner side cylindrical portion (or the outer side cylindrical portion), the outflow of the air in the inner space is restricted to thereby improve damper effect in the inner space. This can suppress the shocks generated upon the contact of the first rod with the second rod.

According to the sixth aspect of the invention the generation of the basic hydraulic braking force is restricted by the slidable movement of the second rod relative to the first rod during a period of time from the time when the depression of the brake pedal starts until the time when the tip end portion in the cylindrical portion contacts with the bottom of the cylindrical portion upon the non-emergency depression of the brake pedal. On the other hand, the generation restriction of the basic hydraulic braking force is released when the second rod pushes the first rod by means of the fluid which is compressed in the inner space after the depression of the brake pedal started and before the tip end portion in the cylindrical portion contacts with the bottom of the cylindrical portion upon the emergency depression of the brake pedal. Accordingly, from the time the brake pedal is started to be depressed to the time the tip end portion in the cylindrical portion contacts with the bottom of the cylindrical portion, in other words, in a low depression force stage, the regenerative braking force is positively utilized to attain the high regeneration efficiency and high fuel efficiency upon a non-emergency brake pedal depression. On the other hand, upon an emergency brake pedal depression, quick application of the basic hydraulic braking force can be performed in priority to attainment of the high regeneration efficiency and high fuel efficiency.

According to the seventh aspect of the invention, the depression position of the brake pedal where the tip end portion in the cylindrical portion contacts with the bottom of the cylindrical portion is set based on the maximum generative braking force that can be generated by the regeneration brake device. Thus, when the brake pedal stroke is positioned exceeding the contacting position upon non-emergency depression of the brake pedal, the vehicle braking force corresponding to the brake pedal operation condition can be applied to the vehicle by the basic hydraulic braking force generated by the hydraulic brake device and the maximum regenerative braking force generated by the regeneration brake device. This can attain the high regeneration efficiency.

According to the eighth aspect of the invention the vehicle brake device further comprises a control valve for opening or closing a fluid passage which is connected to the communication passage; and a detecting means for detecting the emergency depression of the brake pedal and the control valve closes the communication passage when the detecting means detects the emergency depression and opens the communication passage when the detecting means does not detect the emergency depression. Thus, the communication passage can be surely closed or opened in response to emergency depression or non-emergency depression of the brake pedal.

According to the ninth aspect of the invention the vehicle brake device is provided with a brake assisting device which is operated under a condition that the second rod being slidably moving together with the first rod upon emergency depression of the brake pedal. Thus when the brake pedal is suddenly depressed upon emergency braking, early supplying of the basic hydraulic braking force can be surely attained by the brake assisting device.

BRIEF EXPLANATION OF ATTACHED DRAWINGS

THE EMBODIMENTS FOR IMPLEMENTING THE INVENTION

1) First Embodiment

Figure 1:
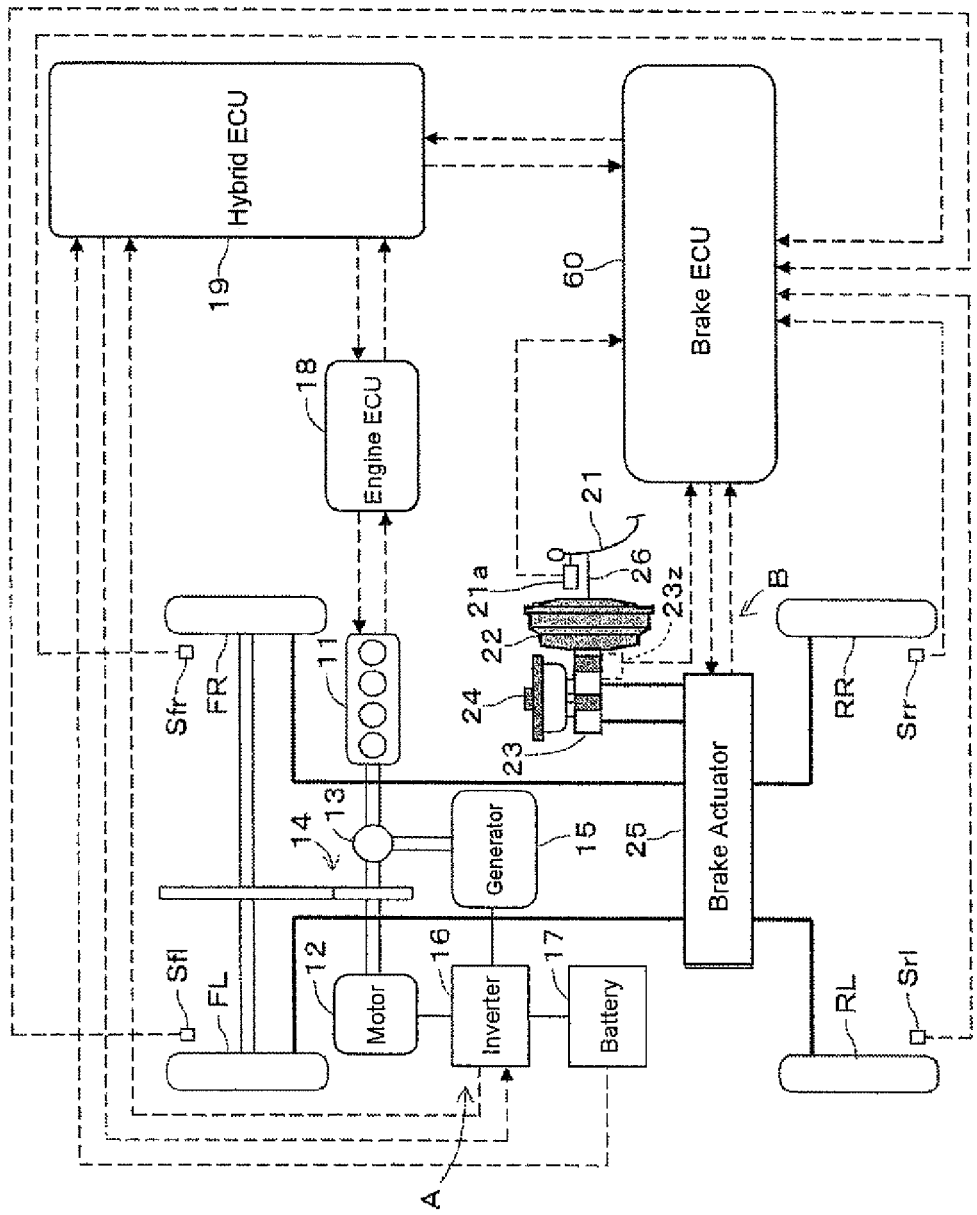
FIG. 1 is a block view showing a vehicle brake device according to a first embodiment of the invention.
Figure 2:
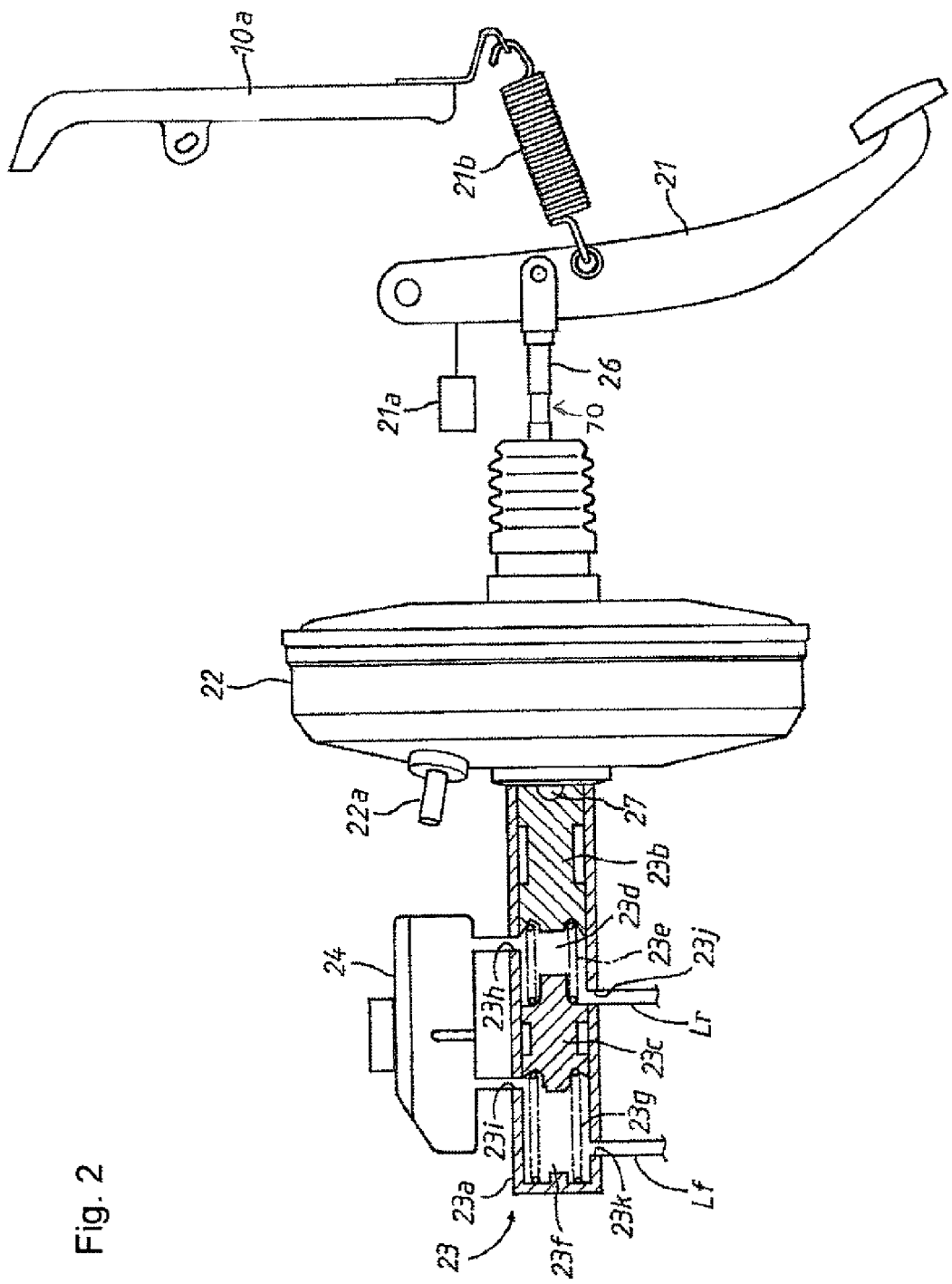
FIG. 2 shows a condition of the basic hydraulic braking force generation device shown in FIG. 1, before the brake pedal is depressed.

The vehicle brake device associated with the present invention adapted to a hybrid vehicle according to a first embodiment will be explained with reference to the attached drawings. FIG. 1 shows an outline view of the structure of the hybrid vehicle and FIG. 2 is an outline view of the structure of the basic hydraulic braking force generation device of the vehicle brake device. The hybrid vehicle as shown in FIG. 1, includes driving wheels such as for example, right front and left front wheels FR and FL driven by the hybrid system. The hybrid system includes a power train using in combining two kind of power sources, engine 11 and motor 12. According to this first embodiment, the hybrid system is a parallel hybrid system in which the vehicle wheels are directly driven by both engine 11 and motor 12. As another hybrid system, a serial hybrid system has been developed in which the motor 12 drives the vehicle wheels and the engine 11 functions as an electricity supply source for supplying the motor 12 with electricity.

The hybrid vehicle with the parallel hybrid system includes the engine 11 and the motor 12. The driving force of the engine 11 is transmitted to the driving wheels (in this first embodiment, right, left front wheels FR and FL) via a power split mechanism 13 and a power transmitting mechanism 14 and the driving force of the motor 12 is transmitted to the driving wheels via the power transmitting mechanism 14. The power split mechanism 13 properly divides the driving force of the engine 11 into a vehicle driving force and an electric generator driving force. The power transmitting mechanism 14 transmits to the driving wheels the driving forces of the engine 11 and the motor 12 by properly integrating the two in response to the running condition of the vehicle. The power transmitting mechanism 14 adjusts the driving ratio of the driving force of the engine 11 and the motor 12 to be between 0:100 and 100:0. This power transmitting mechanism 14 includes the speed change function.

The motor 12 assists the output of the engine 11 to improve the driving force and on the other hand, the motor generates electricity upon vehicle braking operation and charges the battery 17. An electric generator 15 generates electricity by the output of the engine 11 and has the function of starter for start-up of engine. The motor 12 and the electric generator 15 are electrically connected to an inverter 16, respectively. The inverter 16 is electrically connected to the battery 17 as the DC electric power source and serves to supply the battery 17 with the AC voltages inputted from the motor 12 and the electric generator 15 by converting into the DC voltages or vice versa, serves to output the DC voltages from the battery 17 to the motor 12 and the electric generator 15 by converting into the AC voltages.

According to the first embodiment, a regeneration brake device A is formed by the motor 12, the inverter 16 and the battery 17. This regeneration brake device A generates the regenerative braking force at any of (in this first embodiment, vehicle wheels FR and FL driven by the motor 12 as the driving power source) the vehicle wheels FR, FL and RR, RL based on the brake operation condition (later explained) detected by a pedal stroke sensor 21a (or a pressure sensor P).

The engine 11 is controlled by an engine ECU (Electronic Control Unit) 18 and the engine ECU 18 controls to adjust the rotation speed of the engine 11 by outputting opening degree instructions to an electronic control throttle valve in response to an engine output requirement value from a later explained hybrid ECU (electronic Control Unit) 19. The hybrid ECU 19 is connected to the inverter 16 for mutual communication. Necessary engine output, electric motor torque and electric generator torque are introduced from the throttle opening degree and shift position (calculated by the shift position signal inputted from a not shown shift position sensor) and inputted to the hybrid ECU 19. The hybrid ECU 19 then outputs the engine output requirement value to the engine ECU 18 to control the driving force of the engine 11 and controls the motor 12 and the electric generator 15 through the inverter 16 according to the inputted electric motor torque requirement value and the electric generator torque requirement value. Further, the hybrid ECU 19 is connected to the battery 17 to watch the battery charge condition and the charge current and also is connected to a throttle opening degree sensor (not shown) to be installed in an acceleration pedal (not shown) for detecting a vehicle throttle opening degree. The hybrid ECU 19 inputs the throttle opening degree signal from the throttle opening degree sensor.

Figure 4:
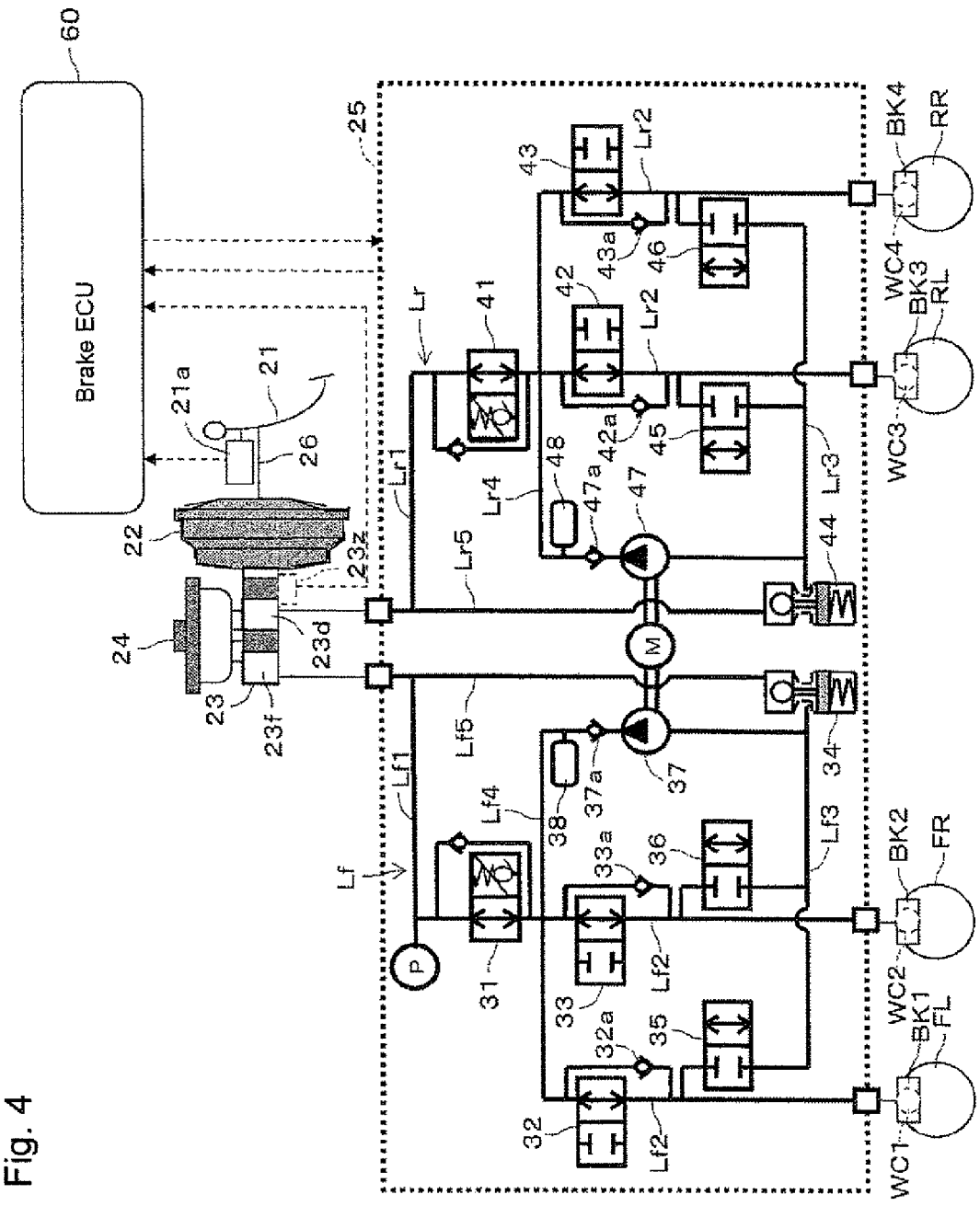
FIG. 4 is a block view of a brake actuator of the hydraulic brake device shown in FIG. 1.

The hybrid vehicle is equipped with a hydraulic brake device B for braking or stopping the vehicle by applying hydraulic braking force to each vehicle wheel FL, FR, RR and RL directly. The hydraulic brake device B, as shown in FIG. 4, generates a basic hydraulic braking force in response to a basic hydraulic pressure at each vehicle wheel FL, FR, RL and RR, by generating the basic hydraulic pressure at a master cylinder 23 in response to a brake pedal 21 depression force and applying the generated basic hydraulic pressure directly to each wheel cylinder WC1, WC2, WC3 and WC4 of each vehicle wheel which is hydraulically connected to the master cylinder 23 through a hydraulic passage Lf and Lr in which hydraulic pressure control valves 31 and 41 are respectively interposed. The vehicle brake device B applies vehicle braking force to the vehicle in response to the brake pedal operation condition based on the basic hydraulic braking force and at the same time, independently of the basic hydraulic pressure generated corresponding to the brake operation condition, a controlled hydraulic pressure built by driving pumps 37 and 47 and by controlling the hydraulic control valves 31 and 41 is applied to each wheel cylinder WC1, WC2, WC3 and WC4 of each vehicle wheel FL, FR, RL and RR so that the controlled hydraulic braking force can be generated at each vehicle wheel FL, FR, RL and RR.

This hydraulic brake device B includes a vacuum brake booster 22 which is a boosting device for assisting the brake operation force generated by depressing the brake pedal 21 by operating the engine intake vacuum pressure to the diaphragm, the master cylinder 23 supplying hydraulically pressurized brake fluid (liquid) which is the basic hydraulic pressure corresponding to the brake operation force boosted by the vacuum booster 22 (i.e., brake pedal operation condition) to the wheel cylinders WC1 through WC4, a reservoir tank 24 reserving the brake fluid therein to supply the master cylinder 23 with the brake fluid and a brake actuator 25 (controlled hydraulic braking force generation device). The basic hydraulic braking force generation device is formed by the brake pedal 21, the vacuum booster 22, master cylinder 23 and the reservoir tank 24.

As shown in FIG. 2, the brake pedal 21 is connected to the vacuum booster 22 through an operating rod 26 and the vacuum booster 22 is connected to the master cylinder 23 through a push rod 27. The brake operation force applied to the brake pedal 21 is inputted to the vacuum booster 22 through the operating rod 26 and boosted by the vacuum booster 22 and boosted operation force is inputted to the master cylinder 23 through the push rod 27.

The brake pedal 21 is provided with a pedal stroke sensor 21*a* for detecting the brake pedal stroke which corresponds to the brake operation condition by the depression of the brake pedal 21. This pedal stroke sensor 21*a* is connected to a brake ECU 60 for sending a detecting signal to the brake ECU. Further, the brake pedal 21 is provided with a reaction force spring 21*b* which is a pedal reaction producing means for producing a pedal reaction force of the brake pedal 21 until the brake operation condition becomes a predetermined condition (which will be explained later). The reaction force spring 21*b* is connected to a bracket 10*a* fixed to the vehicle body at one end thereof and is biasing the brake pedal 21 in a depression releasing direction which corresponds to the reverse direction to the brake pedal depression direction (direction where the brake pedal 21 returns to the original position before depression). The biasing force of this reaction force spring 21*b* is preferably designed considering the inner diameter of a housing 23*a* of the master cylinder 23 and a boosting ratio, etc.

The vacuum booster 22 is of a well known type and a vacuum intake port 22*a* is in communication with an intake manifold of the engine 11 and the vacuum booster 22 uses the vacuum in the intake manifold as the boosting power source.

The master cylinder 23 is, as shown in FIG. 2, a tandem type master cylinder having the housing 23*a* formed to be of cylindrical shape with a bottom, a first piston 23*b* and a second piston 23*c* housed liquid-tightly and arranged slidably movably within the housing 23*a*, a first spring 23*e* disposed in a first hydraulic chamber 23*d* formed between the first and the second pistons 23*b* and 23*c* and a second spring 23*g* disposed in a second hydraulic chamber 23*f* formed between the second piston 23*c* and the closed end of the housing 23*a*. Thus, the second piston 23*c* is biased towards the open end side of the housing (towards the first piston 23*b* side) by the second spring 23*g* and the first piston 23*b* is biased towards the open end by the first spring 23*e* so that the one end (open end side) of the first piston 23*b* is pushed by the tip end of the push rod 27 to be in contact therewith.

The housing 23*a* of the master cylinder 23 is provided with a first port 23*h* for establishing communication between the first hydraulic chamber 23*d* and the reservoir tank 24 and a second port 23*i* for establishing communication between the second hydraulic chamber 23*f* and the reservoir tank 24. The first port 23*h* is provided at a position where the first piston 23*b* is positioned at a first position (return position: condition of FIG. 2) where the brake pedal 21 is released from the foot of an operator of the vehicle, i.e., the condition the brake pedal is not depressed, and the closed end of the first piston, which closes the first port 23*h*, corresponds to the opening end of the first port 23*h* (i.e., the position immediately before the closed end of the first piston 23*b* starts to close the opening of the first port 23*h*). Similar to the position of the first port, the second port 23*i* is provided at a position where the second piston 23*c* is positioned at a first position (return position: condition of FIG. 2) and the closed end of the second piston 23*c* which closes the second port 23*i*, corresponds to the opening end of the second port 23*i* (i.e., the position immediately before the closed end of the second piston 23*c* starts to close the opening of the second port 23*i*).

Further, the housing 23*a* of the master cylinder 23 is provided with a third port 23*j* for establishing communication between the first hydraulic chamber 23*d* and a hydraulic passage Lr forming a rear wheel system and a fourth port 23*k* for establishing communication between the second hydraulic chamber 23*f* and a hydraulic passage Lf forming a front wheel system. As shown in FIG. 4, the hydraulic passage Lr establishes communication among the first hydraulic chamber 23*d*, front right and left wheels RR and RL and corresponding wheel cylinders WC4 and WC3. The hydraulic passage Lf establishes communication among the second hydraulic chamber 23*f*, rear right and left wheels FR and FL and corresponding wheel cylinders WC2 and WC1.

Each wheel cylinder WC1, WC2, WC3 and WC4 operates each brake means BK1, BK2, BK3 and BK4 to apply hydraulic braking force (basic hydraulic braking force, braking hydraulic braking force) to corresponding each vehicle wheel FL, FR, RL and RR, when the hydraulic pressure (basic hydraulic pressure, controlled hydraulic pressure) is supplied to each wheel cylinder WC1-WC4 from the master cylinder 23 via the hydraulic passages Lf and Lr. The brake means BK1-BK4 may include disc brake and brake pad as a friction material or drum brake and brake shoe as a friction material. The friction material, such as brake pad or the brake shoe restricts the rotation of disc rotor or brake drum which is installed integrally with the vehicle wheel.

The operating rod 26 is disposed between the brake pedal 21 and the first piston 23*b* of the master cylinder 23 for connecting the two members 21 and 23*b* and is a connecting member for transmitting the operation force applied to the brake pedal 21 to the first piston 23*b* of the master cylinder 23. Such connecting member may be of any type as long as the member is provided between the brake pedal 21 and the first piston 23*b* of the master cylinder 23 for connecting therebetween and accordingly, a push rod 27 may be adopted as the connecting member.

In more detail, the operating rod 26 is structured to include an operation force transmitting mechanism 70 which does not transmit the operation force applied to the brake pedal 21 to the first piston 23*b* of the master cylinder 23 while the brake operation condition is from the depression start condition to a predetermined condition but does transmit the operation force applied to the brake pedal 21 to the first piston 23*b* of the master cylinder 23 after the predetermined brake operation condition. This operation force transmitting mechanism 70 is a connecting mechanism for operatively connecting the brake pedal 21 and the first piston 23*b* of the master cylinder 23.

The operation force transmitting mechanism 70 is provided at a connecting portion between a first operating rod 26*a* (first rod) which is the brake pedal 21 side portion and a second operating rod 26*b* (second rod) which is the master cylinder 23 side portion both forming the operating rod 26. In more detail, one end of the first operating rod 26*a* is connected to the brake pedal 21 and the other end (tip end) of the first operating rod 26*a* is formed with a cylindrical portion 71 (outer cylindrical portion). The cylindrical portion 71 is of cylindrical shape, with tip end thereof being open and with the other end having a bottom. The other end of the second operating rod 26*b* is connected to the master cylinder 23 (first piston 23*b*) through the push rod 27. One end (tip end) of the second operating rod 26*b* is formed with a cylindrical engaging portion 72 (inner cylindrical portion) housed within the cylindrical portion 71 and slidably reciprocatable therein.

The cylindrical engaging portion 72 is designed not to be coming off from the cylindrical portion 71. Further, a spring 73 is disposed between the cylindrical portion 71 and the cylindrical engaging portion 72 for biasing the both rods 26a and 26b in mutually separating directions along the reciprocating direction (direction in which the volume of an inner space 75 is increasing). This operation force transmitting mechanism 70 corresponds to the basic hydraulic braking force generation restricting means.

An area between the tip end portion of the first operating rod 26a and the tip end portion of the second operating rod 26b, in other words, between the cylindrical portion 71 and the cylindrical engaging portion 72 is provided with the inner space 75 to be filled with fluid (in this embodiment, the air). The volume of the inner space 75 varies depending on the relative displacement between the cylindrical engaging portion 72 and the cylindrical portion 71 (displacement of the cylindrical engaging portion 72 relative to the cylindrical portion 71). As the fluid, not only the gas, but also the liquid may be applied.

The operation force transmitting mechanism 70 is provided with a communication passage 74 through which the fluid in the inner space 75 flows in or out establishing the communication between the inside and outside of the inner space 75. The communication passage 74 is structured to restrict the outflow of the fluid in the inner space 75 when the brake pedal 21 is depressed suddenly and not to restrict the outflow when the brake pedal 21 is depressed with a normal depression speed. The communication passage 74 is formed with an orifice and this orifice corresponds to a gap between the cylindrical portion 71 of the first operating rod 26a and the cylindrical engaging portion 72 of the second operating rod 26b. The emergency depression of the brake pedal 21 is faster than the speed at the normal depression.

The operation of thus structured hydraulic brake device B including the connecting member will be explained hereinafter. First, the operation force transmitting mechanism 70 indicates the condition shown in FIG. 3 wherein the brake pedal 21 is not depressed, master cylinder pressure (basic hydraulic pressure) is not generated and the brake actuator 25 is not operated, and accordingly braking force is not generated. The operating rod 26 is fully extended by receiving the biasing force of the spring 73.

When the brake pedal 21 is depressed in a normal manner, not suddenly depressed, the outflow of the fluid in the inner space 75 of the operation force transmitting mechanism 70 is not restricted by the communication passage 74. The volume of the inner space 75 is decreased but the air inside thereof is substantially not compressed and accordingly, the second operating rod 26b is in a condition that the second operating rod 26b is slidably moving into the first operating rod 26a. The first operating rod 26a does not push the second operating rod 26b until the first operating rod 26a is brought into contact with the second operating rod 26b.

It is noted here that the condition that the second operating rod 26b is slidably moving into the first operating rod 26a means that the first operating rod 26a is slidably moving relative to the stopped second operating rod 26b as shown in this embodiment.

In other words, when the brake pedal 21 is depressed for normal braking, the first operating rod 26a moves towards the second operating rod 26b overcoming the biasing force of the spring 73. The biasing force of the spring 73 is set to be smaller than each biasing force of return spring of the vacuum booster 22 and each biasing force of spring 23e and 23g of the master cylinder 23 biasing the second operating rod 26b in a direction to return the second operating rod 26b to the original position. Accordingly, although the spring 73 is compressed, the second operating rod 26b does not move. In other words, since the generation of the master cylinder pressure at the master cylinder 23 is restricted, the master cylinder pressure is not applied to each wheel cylinder WC1 to WC4.

Figure 3:
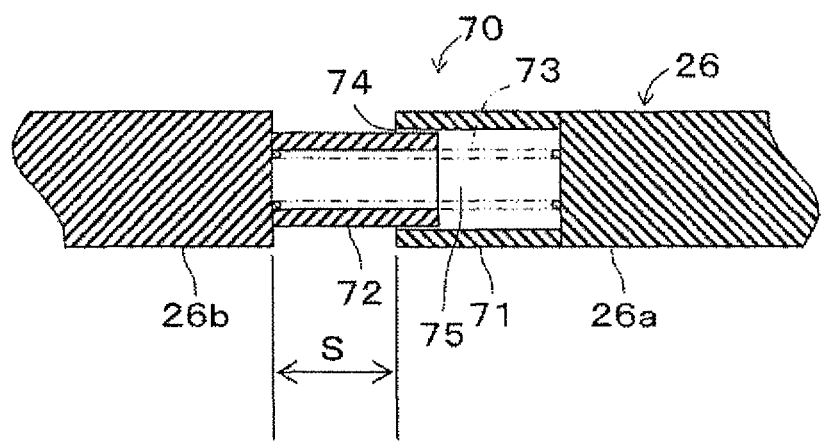
FIG. 3 is a cross sectional view of the operation force transmitting mechanism shown in FIG. 1.

Further, when the brake pedal 21 is depressed, the tip end portion of the cylindrical engaging portion 72 in the cylindrical portion 71 is brought into contact with the bottom of the cylindrical portion 71 (or one end surface of the cylindrical portion 71 is brought into contact with a step portion of the cylindrical engaging portion 72). Thereafter the second operating rod 26b is stared to move together with the first operating rod 26a in response to the operation force. In other words, the master cylinder pressure is started to be generated at the master cylinder 23 and the master cylinder pressure generated according to the depression of the brake pedal 21 is applied to each wheel cylinder WC1 to WC4. Once the depression of the brake pedal 21 is released, the operation force transmitting mechanism 70 returns to the original condition as indicated in FIG. 3.

Figure 5:
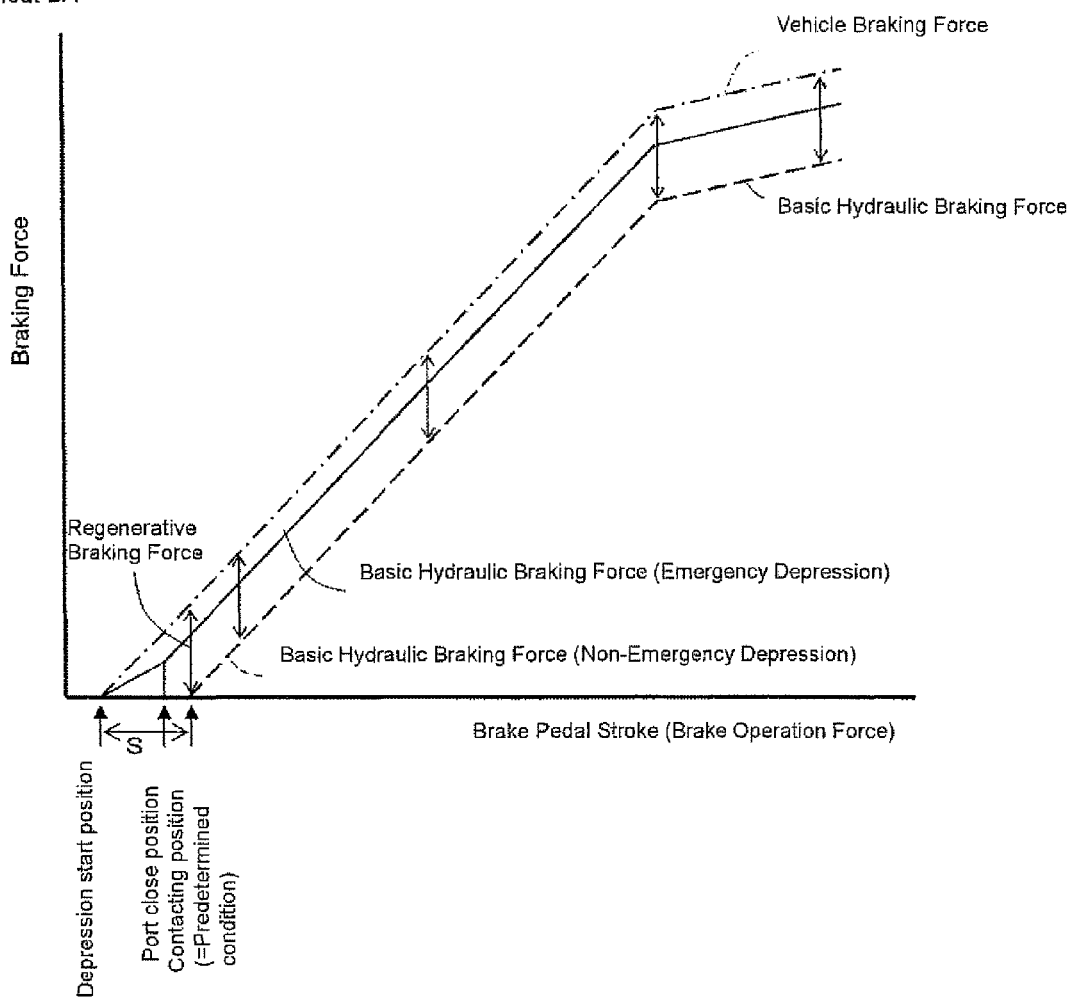
FIG. 5 is a graph showing the correlative relationship between the brake operation force and the braking force of the vehicle brake device according to the first embedment of the invention.

The basic hydraulic braking force by the basic hydraulic pressure produced by the hydraulic brake device B is shown in FIG. 5 with a dotted line. In more detail, while the brake pedal stroke is positioned from the depression start position to the position where the first operating rod 26a is brought into contact with the second operating rod 26b (contacting position) the basic hydraulic pressure generated in the first and the second hydraulic chambers 23d and 23f of the master cylinder 23 is restricted to zero (0), the basic hydraulic braking force is restricted to zero (0). When the brake pedal stroke is positioned beyond the contacting position where the first operating rod 26a is brought into contact with the second operating rod 26b, the basic hydraulic pressure generation restriction is released and the hydraulic pressure in the first and the second hydraulic chambers 23d and 23f becomes the pressure level corresponding to the brake pedal stroke value. The predetermined condition is defined to be the condition where the first operating rod 26a is positioned at the position that the first operating rod 26a is in contact with the second operating rod 26b and that the brake operation condition where the basic hydraulic braking force starts to increase corresponding to the brake pedal stroke. Accordingly, as shown with the dotted line in FIG. 5, the basic hydraulic pressure is directly applied to each wheel cylinder WC1 to WC4 thereby to generate basic hydraulic braking force corresponding to the basic hydraulic pressure.

It is noted that the predetermined condition is defined to be the brake operation condition where the basic hydraulic braking force is started to increase corresponding to the brake operation condition after the generation restriction of the basic hydraulic braking force is released. It is preferable to set the predetermined distance "s" (same as the symbol "s" indicated in FIG. 3) which is the distance from the depression start position to the contacting position to be the value that the regeneration brake device A generates the maximum possible braking force when the brake operation condition becomes the predetermined condition. Thus, when the brake operation condition becomes the predetermined condition, the master cylinder 23 releases the generation restriction of the basic hydraulic braking force and at the same time the regeneration brake device A generates the maximum regenerative braking force. The symbol "s" in FIG. 3 indicates the distance between the one end surface of the cylindrical portion 71 of the first operating rod 26a and the step portion of the cylindrical engaging portion 72 of the second operating rod 26b under the push rod 27 being in non-depression condition.

On the other hand, when the brake pedal 21 is suddenly depressed the outflow of fluid in the inner space 75 of the operation force transmitting mechanism 70 is restricted by the communication passage 74. Under this situation, for example the compressed air is produced in the inner space 75 and the first operating rod 26a pushes the second operating rod 26b and the push rod 27 due to the generated compressed air before the direct contact between the first operating rod 26a and the second operating rod 26b. Accordingly, the second operating rod 26b is under the condition where the second operating rod 26b moves together with the first operating rod 26a. Accordingly, the first piston 23b is pushed by the push rod 27 to close the first port 23h to generate the basic hydraulic pressure in the first hydraulic chamber 23d. In other words, the basic hydraulic braking force generation restricting means allows generation of the basic hydraulic braking force from the depression start position to the contacting position. Thus, when the operator of the vehicle suddenly depresses the brake pedal 21, the basic hydraulic braking force is positively generated while the first operating rod 26a is positioned between the depression start position and the contacting position.

The condition that the second operating rod 26b moves together with the first operating rod 26a is defined to be the condition that both rods 26a and 26b are moving together before the first operating rod 26a is directly brought into contact with the second operating rod 26b.

During this stage, the regeneration brake device A supplements the shortage of the basic hydraulic braking force for sufficiently braking the vehicle by the cooperative operation with the hydraulic brake device B in order to achieve the application of vehicle braking force corresponding to the brake operation condition. Accordingly, during the low depression force area of the first operating rod 26a from the depression start position to the contacting position, quick application of the basic hydraulic braking force can be performed in attainment of high regeneration efficiency and high fuel efficiency upon an emergency depression of the brake pedal 21.

The basic hydraulic braking force performance line by the basic hydraulic pressure produced by the hydraulic brake device B is shown with the solid line in FIG. 5. In other words, when the brake pedal stroke is positioned from the depression start position to the closed position where the first port 23h is completely covered (port closed position), the basic hydraulic pressure is generated without restriction corresponding to the pedal stroke. Further, when the pedal stroke is positioned between the closed position and the position where the first operating rod 26a is brought into contact with the second operating rod 26b (contacting position), the basic hydraulic pressure further increases due to the complete closure of the first port 23h (increase of amount of increase), further larger basic hydraulic pressure is generated. Further, when the brake pedal stroke is positioned beyond the contacting position, the basic hydraulic pressure generated at the first and the second hydraulic chambers 23d and 23f corresponds to the brake pedal stroke and accordingly, the generated basic hydraulic braking force corresponds to the brake pedal stroke.

In this embodiment, the port closed position is set to be in-between the depression start position and the contacting position, but the port closed position may be defined to be the position beyond the contacting position.

The inclination of the basic hydraulic braking force between the case of emergency depression and the non-emergency, normal depression is set considering the individual performance of the master cylinder 23 and the vacuum booster 22 and has the same characteristics. Further, since the first piston 23b is pushed from the depression start position, the initial rising point of the basic hydraulic braking force upon emergency depression comes earlier than the rising point upon non-emergency depression.

Next, the brake actuator 25 will be explained in detail with reference to FIG. 4. The brake actuator 25 is a well known type actuator having one single case in which hydraulic control valves 31 and 41, pressure increase control valves 32, 33, 42 and 43 and pressure decrease control valves 35, 36, 45 and 46 forming the ABS control valve, pressure modulating reservoirs 34 and 44, pumps 37 and 47 and motor M are housed all in one package.

First, the front wheel system structure of the brake actuator 25 will be explained. A hydraulic control valve 31 formed by a pressure differential valve is disposed in the hydraulic passage Lf. This hydraulic control valve 31 is controlled to be switched over between the fluid communication condition and the pressure differential condition by the brake ECU 60. The hydraulic control valve 31 is normal open type valve which is normally in communication condition, but when switched over to the pressure differential condition, the hydraulic control valve 31 maintains the pressure differential condition that the pressure in a hydraulic passage Lf2 communicating with the wheel cylinder WC1 and WC2 side is higher than the pressure in a hydraulic passage Lf1 communicating with the master cylinder 23 side by a predetermined value. This pressure difference is modulated corresponding to the controlling current by the brake ECU 60.

The hydraulic passage Lf2 is branched into two passages and the pressure increase control valve 32 for controlling pressure increase of the brake pressure to be supplied to the wheel cylinder WC1 under the ABS control being in pressure increase mode is provided in one passage and the control valve 33 for controlling pressure increase of the brake pressure to be supplied to the wheel cylinder WC2 under the ABS control being in pressure increase mode is provided in the other passage. These pressure increase control valves 32 and 33 are formed to be two-position valves which control establishing or interrupting communication condition by the brake ECU 60. When the pressure increase control valves 32 and 33 are controlled to be under establishing communication condition, the controlled hydraulic pressure generated by the basic hydraulic pressure of the master cylinder 23 and/or by driving the pump 37 and controlling the hydraulic control valve 31 can be added to the wheel cylinders WC1 and WC2. Further, the pressure increase control valves 32 and 33 execute ABS control together with the pressure decrease control valves 35 and 36 and the pump 37.

When the brake operation is normally performed without executing ABS control, these pressure increase control valves 32 and 33 are controlled to be in normal establishing communication condition. Safety valves 32a and 33a are provided in parallel with the pressure increase control valves 32 and 33, respectively. The safety valves 32a and 33a function to return the brake fluid from the wheel cylinders WC1 and WC2 to the reservoir tank 24 when the brake pedal 21 is released upon ABS controlling.

The hydraulic passage Lf2 between the pressure increase control valves 32 and 33 and each wheel cylinder WC1 and WC2 is in communication with the pressure modulating reservoir 34 via the hydraulic passage Lf3. Pressure decrease control valves 35 and 36 are disposed in the hydraulic passage Lf3 which control establishing communication condition or interrupting communication condition by the brake ECU 60. These pressure decrease control valves 35 and 36 are normally in interrupting communication condition under normal braking operation (non-ABS operation braking) and when relevant, the pressure decrease control valves become establishing communication condition, the brake pressure in the wheel cylinders WC1 and WC2 is controlled to be released to the pressure modulating reservoir 34 via the hydraulic passage Lf3 in order to avoid the vehicle wheel from locking tendency.

Further, the pump 37 and the safety valve 37a are disposed in the hydraulic passage Lf2 between the hydraulic control valve 31 and the pressure increase control valves 32 and 33 and in the hydraulic passage Lf4. Another hydraulic passage Lf5 is provided for connecting the pressure modulating reservoir 34 with the master cylinder 23 via the hydraulic passage Lf1. The pump 37 is driven by the motor M by a command signal from the brake ECU 60. When in the pressure decrease mode under ABS controlling, the pump 37 suctions the brake fluid in the wheel cylinders WC1 and WC2 or the reserved brake fluid in the pressure modulating reservoir 34 and returns the fluid to the master cylinder 23 via the hydraulic control valve 31 under establishing communication condition. Further, the pump 37 suctions the brake fluid in the master cylinder 23 via the hydraulic passages Lf1 and Lf5 and the pressure modulating reservoir 34 and ejects to each wheel cylinder WC1 and WC2 via the hydraulic passages Lf4 and Lf2 and the pressure increase control valves 32 and 33 which are under establishing communication condition to apply the controlled hydraulic pressure. An accumulator 38 is provided in the hydraulic passage Lf4 at the upper stream side of the pump 37 to reduce pulsation of the brake fluid ejected from the pump 37.

Further, in the hydraulic passage Lf1, a pressure sensor P is disposed for detecting the master cylinder pressure which corresponds to the hydraulic brake pressure in the master cylinder 23. The detected signal is sent to the brake ECU 60. The pressure sensor P may be provided in the hydraulic passage Lr1.

The rear wheel system of the brake actuator 25 is similar to the front wheel system in structure. The hydraulic passage Lr forming the rear wheel system includes the hydraulic passages Lr1 to Lr5. In the hydraulic passage Lr, a hydraulic control valve 41 similar to the hydraulic control valve 31 and a pressure modulating reservoir 44 similar to the pressure modulating reservoir 34 are disposed. In the branched passages Lr2 and Lr2 in communication with the wheel cylinders WC3 and WC4, pressure increase control valves 42 and 43 similar to the pressure increase control valves 32 and 33 and in the hydraulic passage Lr3, pressure decrease control valves 45 and 46 similar to the pressure decrease control valves 35 and 36 are disposed. Further, in the hydraulic passage Lr4, pump 47, safety valve 47a and accumulator 48, similar to the pump 37, safety valve 37a and the accumulator 38. Safety valves 42a and 43a similar to the safety valves 32a and 33a are provided at the pressure increase control valves 42 and 43 in parallel with each other.

Thus structured, the controlled hydraulic braking force can be applied to each vehicle wheel FL, FR, RL and RR by applying the controlled hydraulic pressure generated by driving the pumps 37 and 47 and by controlling the hydraulic control valves 31 and 41 to each wheel cylinder WC1 to WC4 of each vehicle wheel FL, FR, RL and RR.

As shown mainly in FIG. 1, the vehicle brake device includes pedal stroke sensor 21a, each vehicle wheel speed sensor Sfl, Sfr, Srl and Srr, pressure sensor P, each control valve 31, 32, 33, 35, 36, 41, 42, 43, 45 and 46 and the brake ECU 60 (Electronic Control Unit) connected to the motor M. The brake ECU 60 controls the controlled hydraulic braking force to be applied to the wheel cylinders WC1 to WC4, i.e., the controlled hydraulic pressure to be applied to each vehicle wheel FL, FR, RL and RR by switching over controlling of the condition of each control valve 31, 32, 33, 35, 36, 41, 42, 43, 45 and 46 or by energization current controlling, based on the detected results of the sensors and condition of the shift switch.

Further, the brake ECU 60 is mutually communicably connected to the hybrid ECU 19 and controls the vehicle braking force so that entire braking force of a vehicle becomes the same as a vehicle equipped with hydraulic brake only by executing cooperative control between the regenerative braking by the motor 12 and the hydraulic braking. In more detail, the brake ECU 60 outputs the regeneration required value which is the share for the regeneration brake device with respect to the entire braking force to the hybrid ECU 19 as the target value of the regeneration brake device, i.e., the target regenerative braking force in response to the required braking force by an operator of the vehicle, in other words, in response to the brake operation condition. The hybrid ECU 19 calculates the actual regeneration execution value actually functioning as the actual regenerative braking force based on the inputted regeneration required value (target regenerative braking force) and considering the vehicle speed and battery charging condition and motor 12 is operated to generate the regenerative braking force corresponding to the actual regeneration execution value via the inverter 16 and the actual regeneration execution value and the calculated actual regeneration execution value is outputted to the brake ECU 60.

Further, the basic hydraulic braking force to be applied to the vehicle wheels FL, FR, RL and RR by the brake means BK1, BK2, BK3 and BK4 when the basic hydraulic pressure is supplied to the wheel cylinders WC1, WC2, WC3 and WC4 is memorized in the brake ECU 60 in advance in the form of map, table or operation expression. Further, the target regenerative braking force to be applied to vehicle wheels FL, FR, RL and RR in response to the brake operation condition which corresponds to the brake pedal stroke (or the master cylinder pressure) is memorized, in advance, in the brake ECU 60 in the form of map, table or operation expression. The cooperative control program (vehicle brake control program) is memorized in the brake ECU 60 as stated in FIG. 6.

Figure 6:
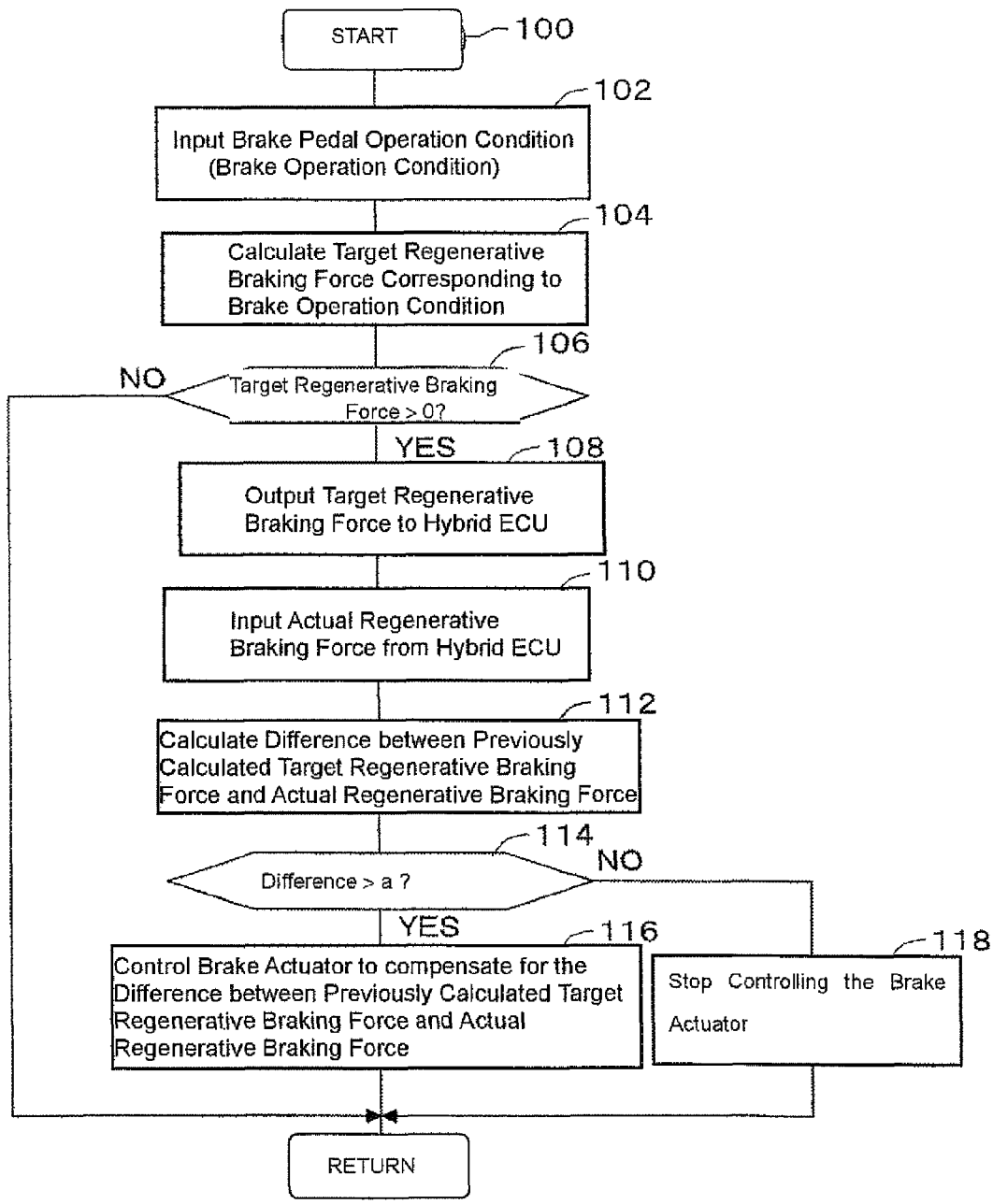
FIG. 6 is a flowchart of a control program executed by the brake ECU shown in FIG. 1.

The operation of the vehicle brake device structured above will be explained with reference to the flowchart in FIG. 6. The brake ECU 60 executes the program corresponding to the flowchart every predetermined short period time when the vehicle ignition switch (not shown) is ON. The brake ECU 60 calculates the target regenerative braking force corresponding to the inputted pedal stroke by inputting the pedal stroke (step 102) which indicates the brake pedal 21 operation conditions obtained from the pedal stroke sensor 21a. The brake ECU 60 uses the map, table or operation expression which indicates the relationship between the pedal stroke memorized in advance, i.e., brake operation condition and the target regenerative braking force to be applied to the vehicle wheels FL, FR, RL and RR.

When the target regenerative braking force is greater than zero (0), the target regenerative braking force calculated at the step 104 is outputted to the hybrid ECU 19 and at the same time, no control is executed for the brake actuator 25 (steps 106 and 108). Accordingly, when the brake pedal 21 is depressed, as similar as the case explained above, the hydraulic brake device B applies only the basic hydraulic braking force (static pressure brake) to the vehicle wheels FL, FR, RL and RR. The hybrid ECU 19 inputs the regeneration required value which indicates the target regenerative braking force and based upon the value and considering the vehicle speed and battery charging condition and etc., motor 12 is controlled via the inverter 16 to generate the regenerative braking force. At the same time, the actual regeneration execution value is outputted to the brake ECU 60. Accordingly, when the brake pedal 21 is operated and the target regenerative braking force is greater than zero, the vehicle wheels FL, FR, RL and RR receive the regenerative braking force in addition to the basic hydraulic braking force. Thus, the regeneration cooperative control is executed. Under this control, the basic hydraulic braking force and the regenerative braking force correspond to the brake operation force and one example is shown in FIG. 5. FIG. 5 shows the correlative relationship between the brake operation force at the regeneration cooperative control and the total of basic hydraulic braking force and the regenerative braking force.

In other words, according to the master cylinder 23 (basic hydraulic braking force generation restricting means) of the first embodiment, when the brake pedal 21 depression is non-emergency operation, the generation of the basic hydraulic braking force is restricted to be a predetermined value or less while the brake operation condition is from the depression start condition which is the condition at the depression start point to a predetermined condition. Under this condition, when the operator of the vehicle depresses the brake pedal 21, as indicated with the dotted line in FIG. 5, the basic hydraulic braking force is forcibly restricted to the predetermined value or less from the depression start condition to the predetermined condition. During this period, only the regenerative braking force is applied in response to the brake operation condition. After the brake operation condition becomes the predetermined condition, the generation restriction of the basic hydraulic braking force is released and at the same time, the regeneration brake device A generates the maximum regenerative braking force and only the maximum regenerative braking force is applied to the vehicle. Further, when the brake operation condition becomes further depressed condition than the predetermined condition, by keeping the release of generation restriction of the basic hydraulic braking force, vehicle braking force is applied corresponding to the brake operation condition based on the basic hydraulic braking force and the regenerative braking force (basically this value is the maximum regenerative braking force) under the cooperative operation between the hydraulic brake device B and the regeneration bake device A.

On the other hand, when the brake pedal 21 is suddenly depressed, no restriction of generation of the basic hydraulic braking force is made and as shown in FIG. 5 with the solid line, the basic hydraulic braking force is applied from the start of depression.

The brake ECU 60 detects the change of actually regenerated braking force by the regeneration brake device A (steps 110 to 114). In more detail, the brake ECU 60 inputs the actual regeneration execution value (step 110) which indicates the actual regenerative braking force applied to the vehicle wheels FL, FR, RL and RR by the regeneration brake device A relative to the target regenerative braking force calculated at the step 104 and calculates the difference between the target regenerative braking force calculated at the step 104 and the inputted actual regeneration execution value at the step 110 (step 112). If the difference therebetween is greater than the predetermined value "a", the regenerative braking force is detected to be changed. (Step 114).

Further, when the brake ECU 60 detects the change of the regenerative braking force, the brake ECU 60 judges to be YES at the step 114 and the pumps 37 and 47 of the hydraulic brake device B are driven to control the hydraulic control valves 31 and 41 to produce the controlled hydraulic pressure. The controlled hydraulic braking force based on the controlled hydraulic pressure is applied to the vehicle wheels FL, FR, RL and RR to compensate for the deficiency of the braking force due to the detected change of the regenerative braking force (Step 116). In detail, the brake ECU 60 controls the controlled hydraulic pressure to be the hydraulic pressure corresponding to the difference between the target braking force calculated at the step 104 and the actual regenerative braking force inputted at the step 110, in other words, the difference calculated at the step 112. The brake ECU 60 activates the motor M to drive the pumps 37 and 47 and energizes the linear solenoid of the pressure differential control valves 31 and 41 so that the hydraulic pressure of the brake fluid supplied to the wheel cylinders WC1 through WC4 from the pumps 37 and 47 becomes the controlled hydraulic pressure. It is preferable to feedback control the linear solenoid 33 so that the hydraulic pressure of the wheel cylinders WC1 through WC4 detected by the hydraulic pressure sensor 40 becomes the controlled hydraulic pressure. On the other hand, the brake ECU 60 judges to be NO when the change of the regenerative braking force is not detected at the step 114 to stop the control of the brake actuator 25 (Step 118).

As apparent from the explanation above, according to the first embodiment, under the non-emergency brake pedal 21 depression, outflow of the fluid from the inner space 75 of the operation force transmitting mechanism 70 formed at the operating rod 26 is not restricted by the communication passage 74. Under this situation, the volume of the inner space 75 becomes small but the fluid in the space 75 is substantially not compressed and accordingly, the second operating rod 26b (second rod) is in sliding condition on the first operating rod 26a (first rod). Under this situation, the generation of the basic hydraulic braking force is restricted. Therefore, when the operator of the vehicle suddenly depresses the brake pedal 21, particularly, when the first operating rod 26a positions from the depression start position to the contacting position, the basic hydraulic braking force is forcibly restricted to the predetermined value or less. Further, during this braking operation, the regeneration brake device A supplements the deficiency of the basic hydraulic braking force relative to the vehicle braking force by the cooperative operation with the hydraulic brake device B to obtain vehicle braking force corresponding to the brake operation condition. Accordingly, when the brake pedal 21 is suddenly depressed, regenerative braking force is positively used particularly when the first operating rod 26a positions in the area of a low depression force, which is the position from the depression start to the contacting position thereby achieving high regeneration efficiency or the high fuel efficiency.

On the other hand, upon emergency depression of the brake pedal 21, the outflow from the inner space 75 is restricted by the communication passage 74. At this stage, for example, the compressed air is produced in the inner space 75 and accordingly, the first operating rod 26a pushes the second rod by means of the compressed air before the first operating rod 26a is directly brought into contact with the second operating rod 26b. thus, the second operating rod 26b is in the condition that the second operating rod 26b is moving together with the first operating rod 26a and under this condition, the restriction of generation of the basic hydraulic braking force is released. In other words, the operation force transmitting mechanism 70 (basic hydraulic braking force generation restricting means) generates the basic hydraulic braking force while the first operating rod 26a positions from the depression start position to the contacting position. Accordingly, when the operator of the vehicle suddenly depresses the brake pedal 21, the basic hydraulic braking force is positively generated while the first operating rod 26a positions between the depression start position and the contacting position and during this condition, the regeneration brake device A supplements the deficiency of the basic hydraulic braking force relative to the vehicle braking force by the cooperative operation with the hydraulic brake device B to obtain vehicle braking force corresponding to the brake operation condition. Accordingly, during the low depression force area of the first operating rod 26a from the depression start position to the contacting position, quick application of the basic hydraulic braking force can be performed in priority to attainment of the high regeneration efficiency and high fuel efficiency upon an emergency depression of the brake pedal 21.

As thus explained above, in the low depression force area where the brake pedal 21 depression condition is between the depression start condition and the predetermined condition, the high regeneration efficiency and the high fuel efficiency can be attained by positively utilizing the regenerative braking force upon normal braking operation and early or quick application of the basic hydraulic braking force upon an emergency braking operation in the vehicle brake device at the same time.

The communication passage 74 is an orifice passage and accordingly, the outflow of fluid from the inner space 75 can be throttled with a simple structure.

Further, the orifice is a gap 74 between the first operating rod 26a and the second operating rod 26b and accordingly, the fluid in the inner space 75 flowing out can be throttled in a simple and inexpensive way.

At least one of the tip ends of the first and the second operating rods 26a and 26b is provided with a cylindrical portion tip end thereof being open and the other end thereof being provided with a bottom portion 71 and the other of the tip ends of the first and the second operating rods 26a and 26b slides within the cylindrical portion 71 and the inner space 75 is formed between the outer cylindrical portion 71 and the inner cylindrical portion 72. Upon emergency depression operation of the brake pedal 21, the compressed air can be easily and simply produced within the inner space 75.

Further, upon non-emergency depression operation of the brake pedal 21, during the period between the brake pedal depression start and the time when the tip end of the cylindrical engaging portion 72 in the cylindrical portion 71 is brought into contact with the bottom of the cylindrical portion 71, the second operating rod 26b slides in the first operating rod 26a thereby to restrict the generation of the basic hydraulic braking force. On the other hand, upon emergency depression of the brake pedal 21, the first operating rod 26a pushes to move the second operating rod 26b by means of the compressed fluid in the inner space 75, before the tip end of the cylindrical engaging portion 72 of the cylindrical portion 71 is brought into contact with the bottom of the cylindrical portion 71 and the restriction of the generation of the basic hydraulic braking force. Accordingly, in the area of low depression force from the start of depression of the brake pedal 21 until the tip end of the cylindrical engaging portion 72 of the cylindrical portion 71 is brought into contact with the bottom of the cylindrical portion 71, attainment of the high regeneration efficiency and high fuel efficiency can be achieved upon non-emergency braking operation by positively utilizing the regenerative braking force. On the other hand, upon the emergency brake operation, quick application of the basic hydraulic braking force can be performed in priority to attainment of the high regeneration efficiency and high fuel efficiency.

Further, the brake pedal 21 depression position where the tip end of the cylindrical engaging portion 72 in the cylindrical portion 71 is set based on the maximum regenerative braking force that can be generation capable amount by the regeneration brake device A. Thus, while the brake pedal 21 is normally depressed, if the brake stroke positions beyond the contacting position, the vehicle braking force corresponding to the brake pedal operation condition by the basic hydraulic braking force generated by the hydraulic brake device B and the maximum regenerative braking force generated by the regeneration brake device A. This can realize the high regeneration efficiency.

It is noted here that in the first embodiment, the brake operation condition may be detected by a master cylinder stroke sensor 23z which detects the stroke of the master cylinder 23.

2) Second Embodiment

Next, the second embodiment in which the vehicle brake device associated with the invention is adapted to a hybrid vehicle will be explained with reference to the attached drawings. The vacuum booster 22 of the hydraulic brake device B explained is not equipped with a brake assist device. However, according to this second embodiment, the vacuum booster 122 of the hydraulic brake device B is equipped with a brake assist device which is an device to generate and apply a large braking force by assisting a small depression force.

Figure 7:
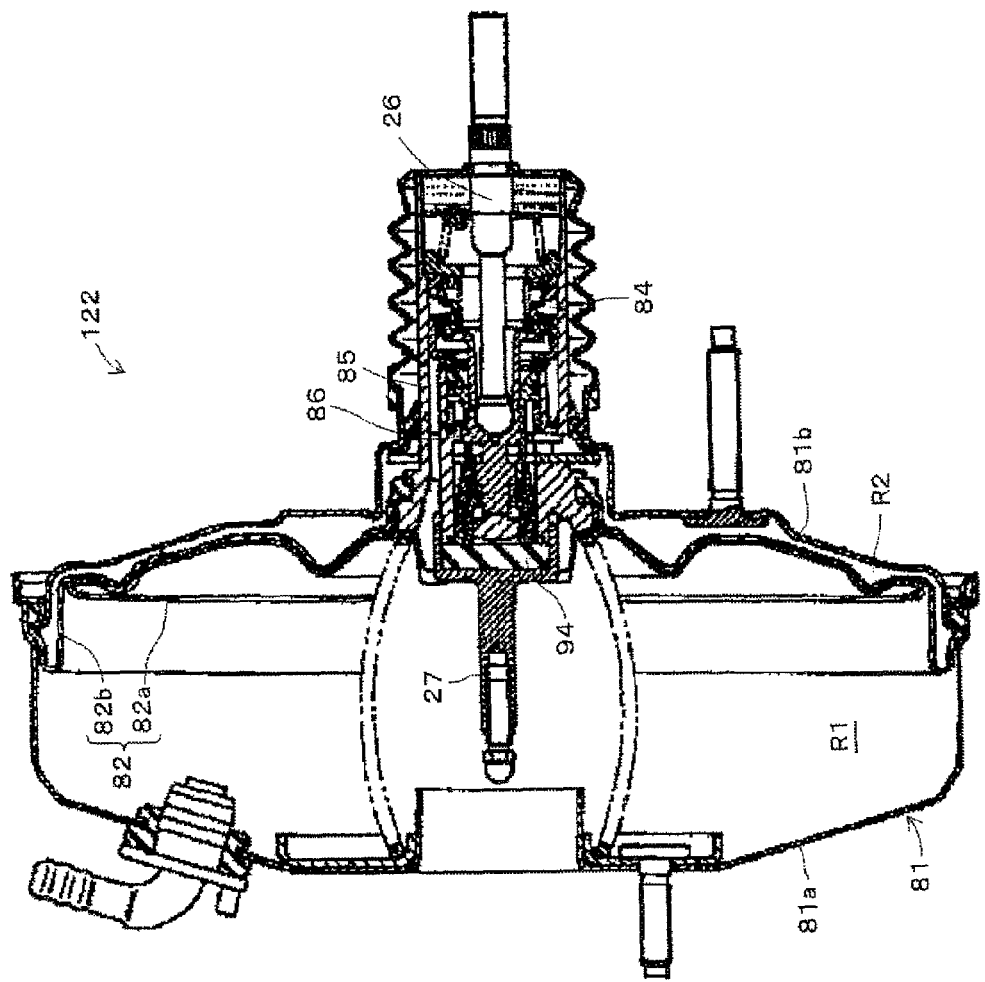
FIG. 7 is a cross sectional view of a vacuum booster for the vehicle brake device according to the second embodiment of the invention.

In FIG. 7, the vacuum booster 122 includes a front shell 81a, a rear shell 81b and a movable wall 82. The vacuum booster 122 is provided with a housing 81 which inside is divided into a constant pressure chamber R1 and a variable pressure chamber R2 by the movable wall 82. The movable wall 82 in the housing 81 is formed by a metal plate 82a and a rubber made diaphragm 82b and is movable in a front/rear direction relative to the housing 81.

The constant pressure chamber R1 is in communication with the engine intake manifold (not shown) which is a vacuum pressure source and the chamber R1 is always kept to the vacuum pressure level during the engine being operated. The variable pressure chamber R2 is connected to or disconnected from the constant pressure chamber R1 through a passage 83 and a valve mechanism 84 and at the same time connected to or disconnected from the atmospheric pressure through the valve mechanism 84.

Figure 8:
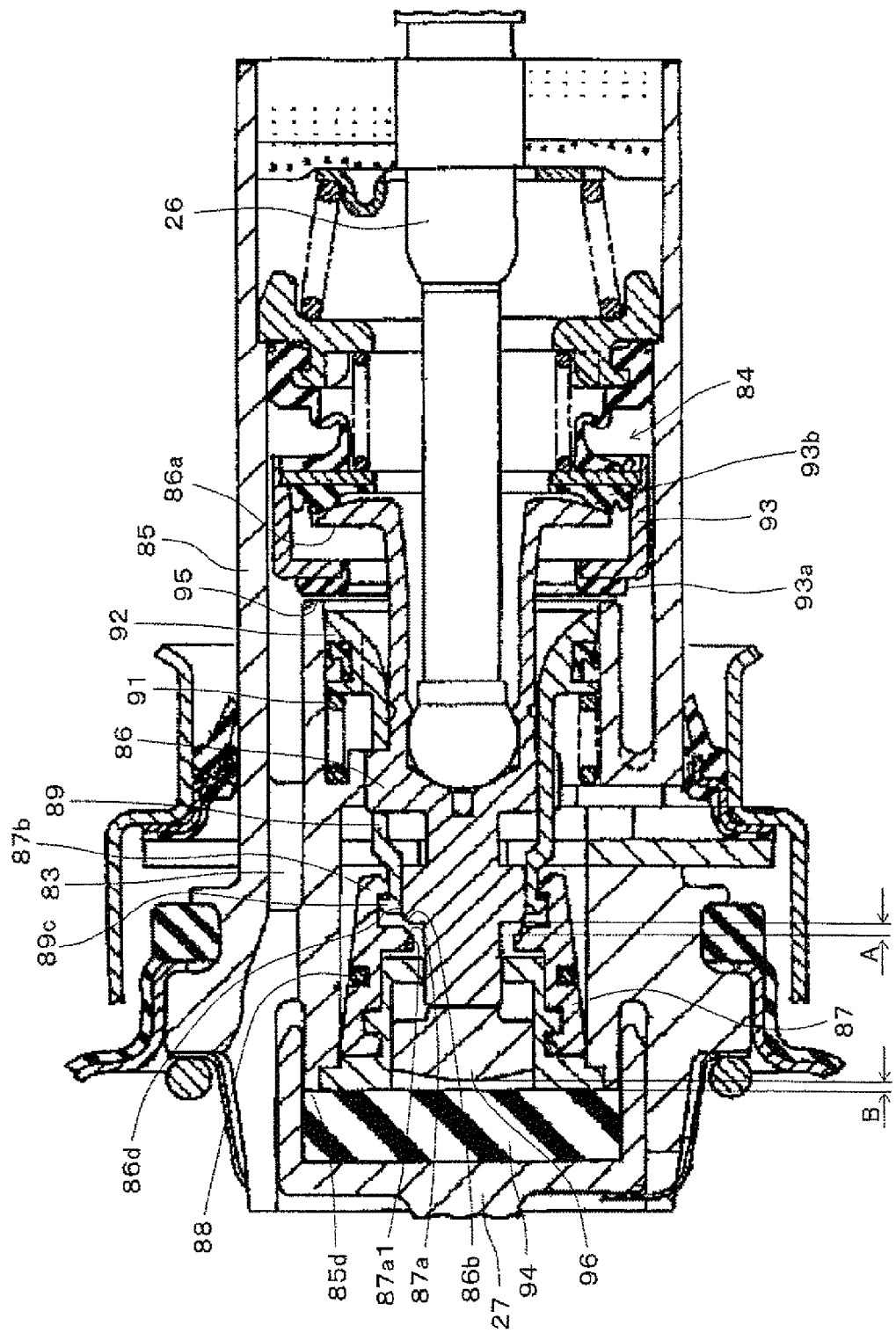
FIG. 8 is a partially enlarged cross sectional view of the vacuum booster shown in FIG. 7.

As shown in FIG. 8, in the vacuum type brake booster 122, when the operator of the vehicle hastily and suddenly depresses the brake pedal 21 and due to this, when the relative displacement amount between the operating rod 26 and the power piston 85 becomes greater than a predetermined value "A", the inclined surface portion 86b of the plunger 86 is brought into contact with the tapered portion 87a of the holding member 87 and at the same time, the holding member 87, which is biased in a direction that the diameter is compressed by a ring shaped resilient body 88, expands the diameter in a radial direction.

When a minimum inner diameter portion 87a1 of the tapered portion 87a rides over the stepped portion 86d of the plunger 86, the engagement between the engaged portion 89c of the valve seat member 89 and the engaging portion 87b of the holding member 87 is released. Since the valve seat member 89 is biased rearward by the spring 91, immediately after the engagement of the engaged portion 89c is released, the valve seat member 89 is moved backward due to the biaing force of the spring 91.

When the valve seat member 89 is moved rearward, the second vacuum pressure valve seat 92 of the valve seat member 89 is brought into contact with the valve 93a which forms the movable portion 93 of the valve mechanism 84 to interrupt the communication between the constant pressure chamber R1 and the variable pressure chamber R2. At this stage, the plunger 86 is under forward movement with the operating rod 26 and the valve seat member 89 pushes the movable portion 93 of the valve mechanism 84 rearward and the atmospheric pressure valve seat 86a of the plunger 86 and the valve 93b forming the movable portion 93 of the valve mechanism 84 are rapidly separated from each other to establish communication between the variable pressure chamber R2 and the atmospheric pressure. As a result, compared to the normal braking operation, the interruption of communication between the constant pressure chamber R1 and the variable pressure chamber R2 and establishment of communication between the variable pressure chamber R2 and the atmospheric pressure are performed rapidly and the distance between the contact surface 85d of the power piston 85 to the reaction force member 94 and the first vacuum pressure valve seat 95 and the distance between the contact surface 85d of the power piston 85 to the reaction force member 94 and the atmospheric pressure valve seat 86a are lengthened. Thus it is possible to increase the output under the jumping condition compared to the output under normal condition.

The emergency brake operation performance of the vacuum booster according to the embodiment can be achieved by varying the jumping characteristics to energize a larger boosting force to the output member than the boosting force at normal braking operation. As shown in FIG. 8, the gap B between the contacting member 96 and the reaction force member 94 is enlarged in order to vary the jumping characteristics. The enlargement of the gap B is the same to lengthen the distance between the contact surface 85d of the power piston 85 to be in contact with the reaction force member 94 and the first vacuum pressure valve seat 95 and the distance between the contact surface 85d of the power piston 85 to be in contact with the reaction force member 94 and the atmospheric pressure valve seat 86a. In other words, by moving the first vacuum pressure valve seat 95 and the atmospheric pressure valve seat 86a rearward to lengthen the gap B and increase the output until the contacting member 96 receives the reaction force from the reaction force member 94. Thus, the output under the so-called jumping condition where the ratio of output relative to the input becomes infinite is increased from the output under normal condition.

Figure 9:
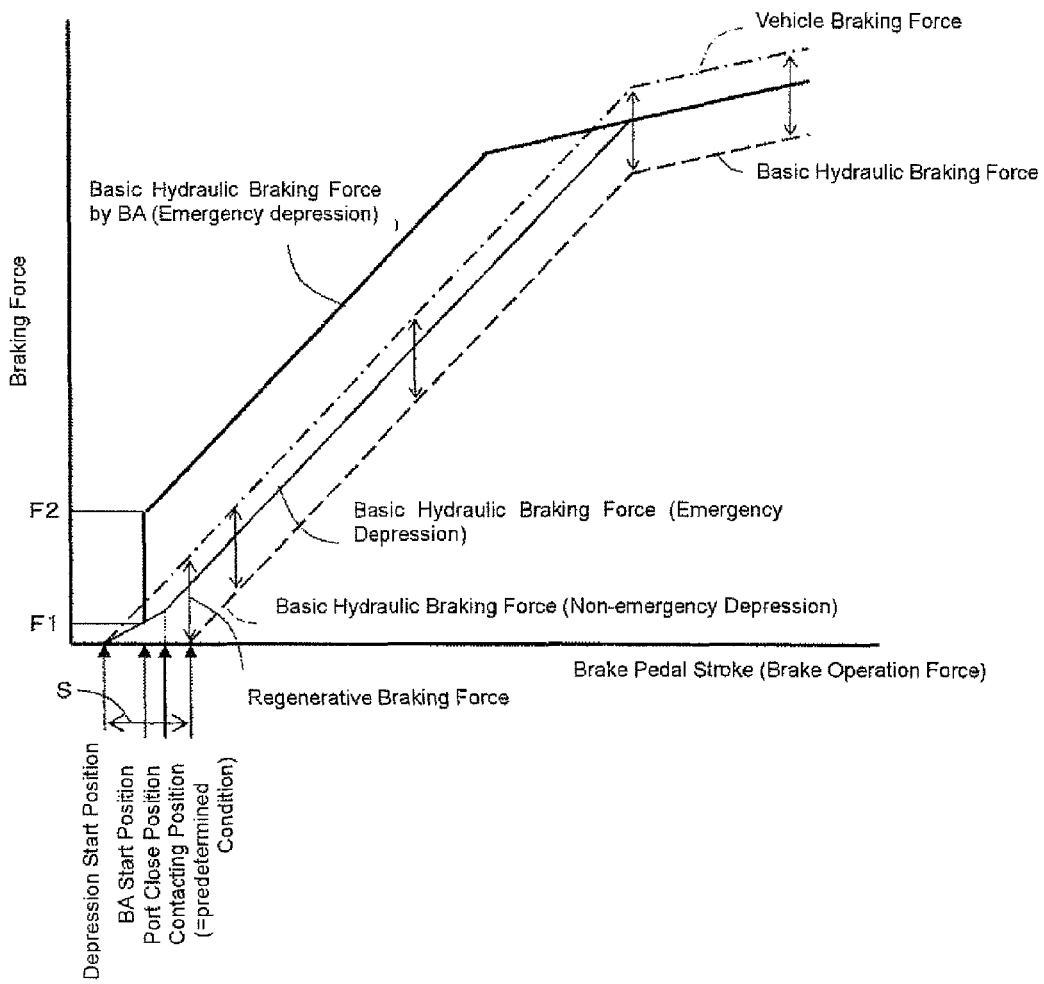
FIG. 9 is a graph showing the correlative relationship between the brake operation force and the braking force of the vehicle brake device according to the second embedment of the invention.

The normal braking performance and the emergency braking performance are shown in FIG. 9. Only the magnitude F1 of the output can be obtained under the jumping at normal braking operation, but the increased magnitude F2 of the output can be obtained under the jumping at an emergency braking and with a small brake pedal 21 depression force, a sufficiently large hydraulic brake pressure can be generated.

According to the vacuum booster of the second embodiment, brake assisting operation starts between the depression start position and the contacting position of the first operating rod 26a.

As apparent from the above explanation, according to the second embodiment, the outflow of the fluid in the inner space 75 of the operation force transmitting mechanism 70 formed on the operating rod 26 is not restricted by the communication passage 74 upon the non-emergency brake pedal 21 depression and accordingly, the same function and effects can be obtained as those of the first embodiment.

On the other hand, upon an emergency depression of the brake pedal 21, the outflow of the fluid in the inner space 75 of the operation force transmitting mechanism 70 is restricted by the communication passage 74. Therefore, the compressed air is produced in the inner space 75, by which the first operating rod 26a pushes the second operating rod 26b and the push rod 27 before the first operating rod 26a directly contacts with the second operating rod 26b. accordingly, the first piston 23b is pushed by the push rod 27 to close the first port 23h to produce the basic hydraulic pressure in the first hydraulic chamber 23d. In other words, the basic hydraulic braking force generation restricting means generates the basic hydraulic braking force between the depression start position of the first operating rod 26b and the contacting position thereof. In other words, the condition where the second operating rod 26b is moving together with the first operating rod 26a. thus, when the operator of the vehicle makes an emergency braking, the basic hydraulic braking force is positively generated while the first operating rod 26a is positioned between the depression start position and the contacting position.

This basic hydraulic braking force by the basic hydraulic pressure produced by the hydraulic brake device B is shown with the bold solid line in FIG. 9. In other words, when the brake pedal stroke is positioned from the depression start position to the brake assisting operation start position (hereinafter referred to as BA start position), as similar to the basic hydraulic braking force upon the emergency braking according to the first embodiment, generation of the basic hydraulic pressure is not restricted and the basic hydraulic pressure is generated in response to the brake pedal stroke. Further, when the brake pedal stroke is positioned beyond the BA start position, the basic hydraulic braking force by the brake assisting operation device is applied in response to the brake pedal stroke. Thus, upon the emergency brake pedal depression, the brake assisting operation device operates under the second operating rod 26b being in movement with the first operating rod 26a.

As explained above, in the low depression force area from the depression start position to the predetermined condition, under non-emergency depression of the brake pedal 21, high regeneration efficiency and high fuel efficiency can be achieved by positively utilizing the regenerative braking force and upon the emergency depression of the brake pedal, a relatively large basic hydraulic braking force by the brake assisting operation device can be rapidly and surely applied.

It is noted here that according to the second embodiment, the brake assisting operation device is shown as a so-called mechanical type brake assisting operation device. However, this device may be structured by a separately provided atmospheric pressure valve formed by solenoid which is open-close controlled. Further the device may be structured by a brake actuator which can generate the controlled hydraulic pressure. In the latter case, it is preferable to include an accumulator which can accumulate a high pressure brake fluid in the hydraulic brake device B. Thus a high pressured controlled hydraulic pressure can be rapidly supplied.

3) Third Embodiment

Next, the vehicle brake device according to the third embodiment of the invention adapted to the hybrid vehicle will be explained with reference to FIGS. 10 through 12. In the first and the second embodiments, the communication passage 74 (orifice) provided in the operation force transmitting mechanism 70 is the gap between the cylindrical portion 71 of the first operating rod 26a and the cylindrical engaging portion 72 of the second operating rod 26b. According to the third embodiment, the communication passage 74 is formed by a through-hole (orifice) formed on a side wall of at least one of the cylindrical portion 71 and the cylindrical engaging portion 72.

Figure 10:
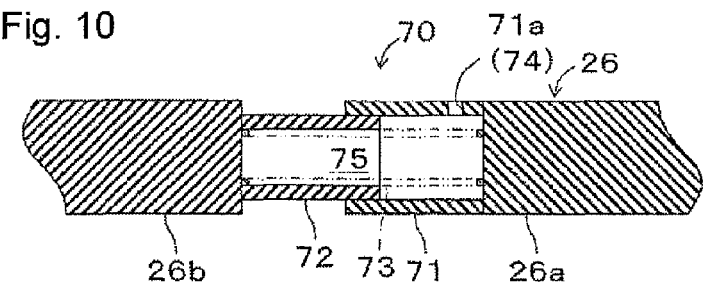
FIG. 10 is a cross sectional view of an example of the operation force transmitting mechanism of the vehicle brake device according to the third embodiment of the invention.

In more detail, as shown in FIG. 10, the through-hole 71a is provided on the cylindrical portion 71. The through-hole 71a may be formed at any position in an axial direction. Upon non-emergency depression, the outflow of fluid from the through-hole 71a is not restricted. Accordingly, the first operating rod 26a moves but the second operating rod 26b does not move until being in contact with the first operating rod 26a thereby improving the regeneration efficiency.

On the other hand, upon the emergency depression, the outflow of the fluid from the through-hole 71a is restricted until the through-hole 71a is closed by the cylindrical engaging portion 72. And accordingly, the second operating rod 26b moves together with the first operating rod 26a and therefore, the basic hydraulic braking force can be applied from early stage. Further, since the inner space 75 is substantially sealed after the through-hole 71a has been closed by the cylindrical engaging portion 72. This sealed inner space functions as the air damper which can suppress the shock generated upon contact between the first and the second operating rods 26a and 26b.

Figure 11:
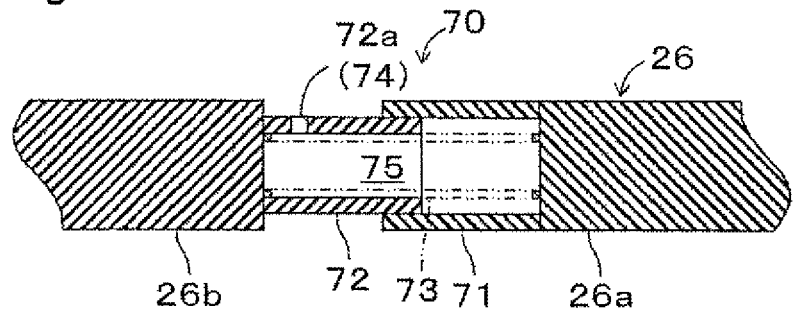
FIG. 11 is a cross sectional view of another example of the operation force transmitting mechanism of the vehicle brake device according to the third embodiment of the invention.
Figure 12:
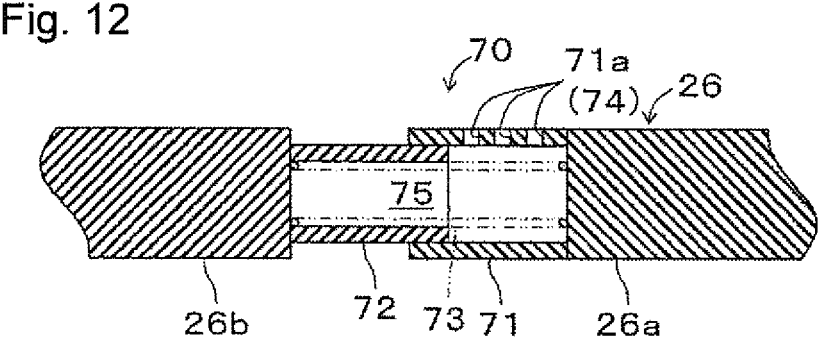
FIG. 12 is a cross sectional view of further example of the operation force transmitting mechanism of the vehicle brake device according to the third embodiment of the invention.

Further, the through-hole 72a may be provided on the cylindrical engaging portion 72 as shown in FIG. 11. In this case, the same function and effects can be obtained as those in the case the through-hole 71a is provided on the cylindrical portion 71.

Further, a plurality of through-holes may be provided in an axial direction. For example, as shown in FIG. 12, a plurality of (in the embodiment, three) through-holes 71a is provided on the cylindrical portion 71 in an axial direction. Each through-hole has the same diameter. By this structure, upon the emergency depression, the number of through-holes which are closed decreases as the stroke amount increases. In other words, by lessening the flow passage cross sectional area of the communication passage 74 as the stroke increases, the air dampening function can be improved. It is noted that the diameter of the plurality of through-holes 71a may be varied.

4) Fourth Embodiment

Figure 13:
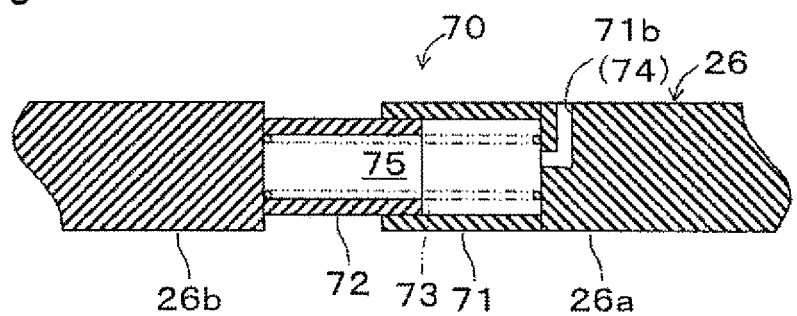
FIG. 13 is a cross sectional view of an example of the operation force transmitting mechanism of the vehicle brake device according to the fourth embodiment of the invention.

Next, the fourth embodiment of the vehicle brake device according to the invention adapted to the hybrid vehicle will be explained with reference to FIG. 13. According to this embodiment, the communication passage 74 is formed by a through-hole provided on at least one of a portion of the first operating rod 26a other than the cylindrical portion 71 and a portion of the second operating rod 26b other than the cylindrical engaging portion 72. In more detail, as shown in FIG. 13, the through-hole 71b is formed on the first operating rod 26a. By this structure of the embodiment, the same operation and effects as the first embodiment of the invention can be obtained.

5) Fifth Embodiment

Next, the fifth embodiment of the vehicle brake device according to the invention adapted to the hybrid vehicle will be explained with reference to FIG. 14. According to this embodiment, the communication passage 74 is formed by a groove provided on at least one of the inner side surface of the cylindrical portion 71 and the outer side surface of the cylindrical engaging portion 72.

Figure 14:
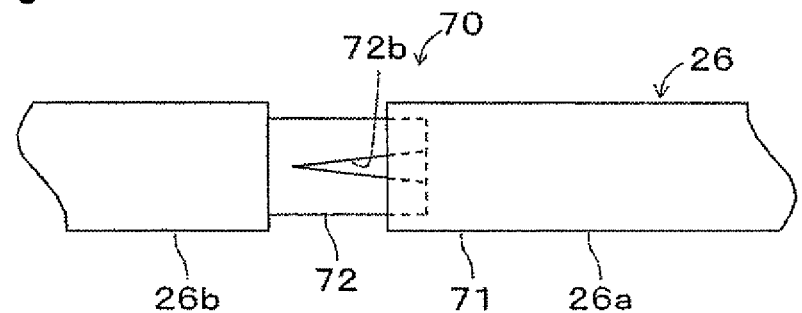
FIG. 14 is a cross sectional view of an example of the operation force transmitting mechanism of the vehicle brake device according to the fifth embodiment of the invention.

In more detail, as shown in FIG. 14, the groove 72b is formed on the outer side surface of the cylindrical engaging portion 72. This groove 72b extends in axial direction from the tip end of the cylindrical engaging portion 72 up to a position just before reaching to the base end thereof. The flow passage cross sectional area of the groove 72b is gradually reduced from the tip end of the cylindrical engaging portion 72 to the base end thereof. The fluid flows out/in from an area between the groove 72b and the inner periphery of the open end of the cylindrical portion 71.

According to this structure, the outflow of the fluid from the groove 72b upon non-emergency braking operation. Although the first operating rod 26a moves, the second operating rod 26b does not move until the first operating rod 26a and the second operating rod 26b are brought into contact with each other. Thus the regeneration efficiency can be improved.

On the other hand, the outflow of fluid from the groove 72b is restricted until the groove 72b is closed by the cylindrical portion 71 upon an emergency braking operation. Accordingly, the first operating rod 26a moves together with the second operating rod 26b thereby to achieve an early supply of the basic hydraulic braking force. Further, after the groove 72b has been closed by the cylindrical portion 71, since the inner space 75 is substantially sealed, air damping effect can be produced to dampen the shocks which may be generated upon the contact between the first and the second operating rods 26a and 26b.

It is noted that the flow passage cross sectional area may be designed to be the same at any portion in an extending direction.

6) Sixth Embodiment

Figure 15:
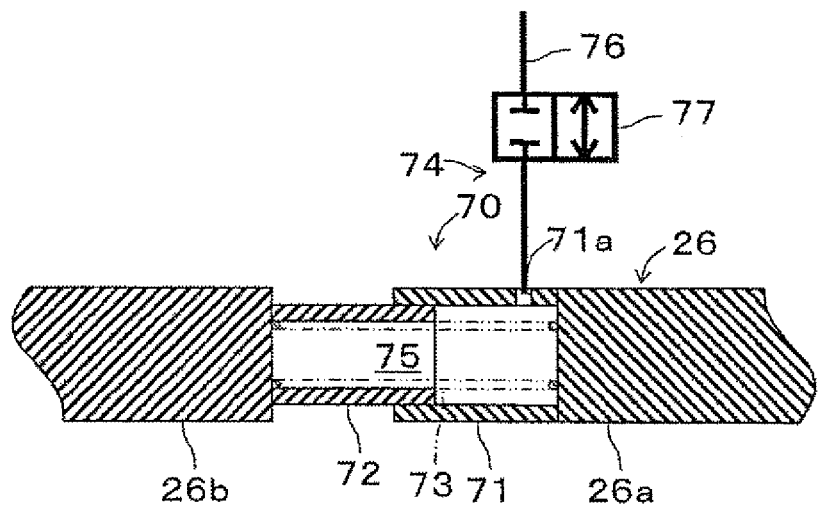
FIG. 15 is a cross sectional view of an example of the operation force transmitting mechanism of the vehicle brake device according to the sixth embodiment of the invention.

Next, the sixth embodiment of the vehicle brake device according to the invention adapted to the hybrid vehicle will be explained with reference to FIG. 15. According to this embodiment, as indicated in FIG. 10, a through-hole (the communication passage) formed on the cylindrical portion 71 or the cylindrical engaging portion 72 is provided with a solenoid valve.

For example, a connecting conduit 76 (fluid passage) exposed to the atmosphere is connected to the through-hole 71a (communication passage) formed on the cylindrical portion 71. In the connecting conduit 76a solenoid valve 77 is disposed which opens or closes the connecting conduit 76.

Upon non-emergency braking operation, the solenoid valve 77 is opened when a sensor for detecting the non-emergency braking detects the non-emergency braking operation and therefore, the outflow of fluid from the through-hole 71a is not restricted. On the other hand, upon an emergency braking operation, the solenoid valve 77 is closed when a sensor for detecting the emergency braking detects the emergency braking operation and therefore, the outflow of fluid from the through-hole 71a is restricted.

7) Other Embodiments

Figure 16:
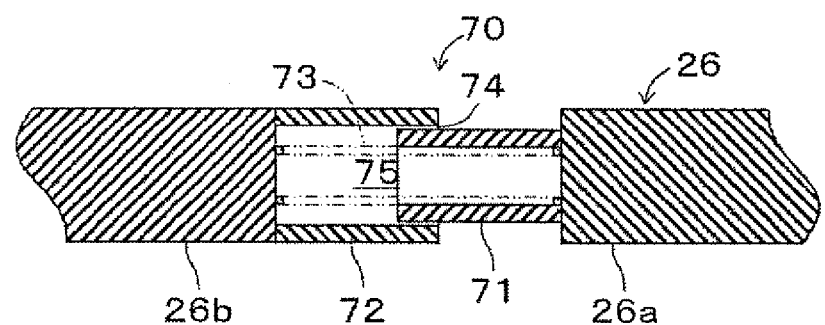
FIG. 16 is a cross sectional view of an example of a modified operation force transmitting mechanism of the vehicle brake device.
Figure 17:
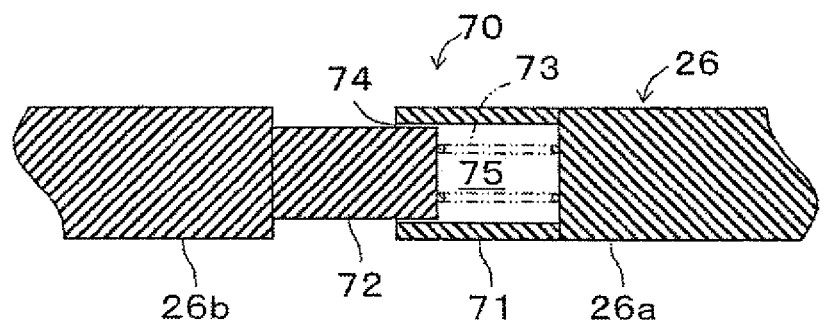
FIG. 17 is a cross sectional view of an example of another modified operation force transmitting mechanism of the vehicle brake device.
Figure 18:
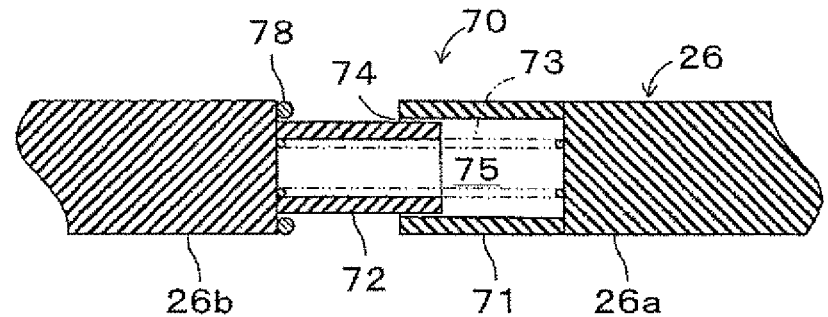
FIG. 18 is a cross sectional view of an example of still another modified operation force transmitting mechanism of the vehicle brake device.

As shown in FIG. 16, the cylindrical portion 71 of the first operating rod 26a may be formed as an inner side cylindrical portion and the cylindrical engaging portion 72 of the second operating rod 26b may be formed as an outer side cylindrical portion. Further as shown in FIG. 17, the inner space of the inner cylindrical portion (cylindrical engaging portion 72) can be eliminated. As shown in FIG. 18, an O-ring 78 may be provided, which is formed by an elastic material and attached to the outer peripheral portion of the cylindrical engaging portion 72. The O-ring can dampen or minimize the shocks generated upon the contact between the first ad the second operating rods 26a and 26b.

8) Seventh Embodiment

Next, the seventh embodiment of the vehicle brake device according to the invention adapted to the hybrid vehicle will be explained with reference to FIG. 19. The reaction force spring 21b is formed with a linear shape in the first embodiment, however, according to the seventh embodiment the reaction force spring 121b is formed with a non-linear shape performance.

Figure 19:
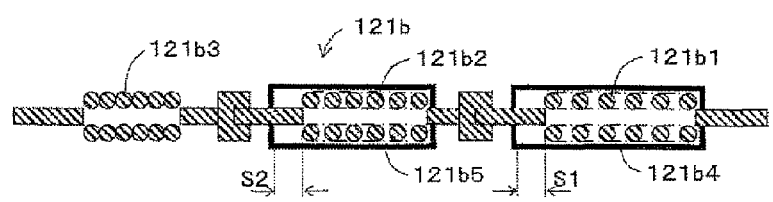
FIG. 19 (a) is a view showing an example of the reaction force spring of the vehicle brake device according to the seventh embodiment of the invention, showing the condition with naturally extended length and FIG. 19 (b) is similar to FIG. 19 (a), but showing the reaction force spring under the condition of extension.
Figure 19:
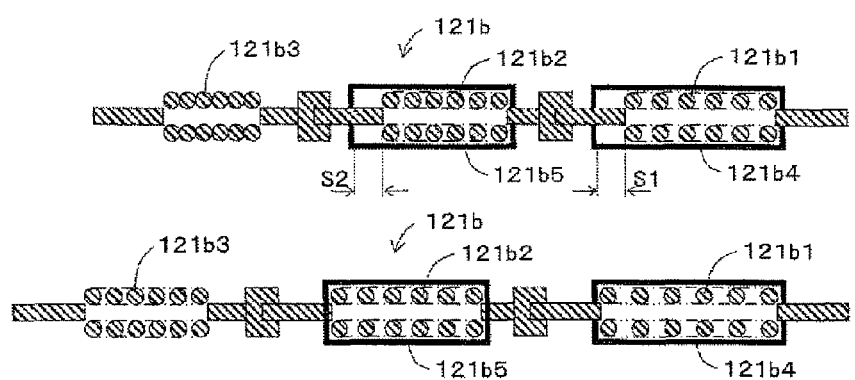

In detail, the reaction force spring 121b is formed by a plurality of linear shaped springs as shown in FIG. 19. The reaction force spring 121b is provided with a plurality of (in this embodiment, three) linear springs, each having a different constant of spring. In other words, the reaction force spring 121b is formed by connecting a first spring 121b1, a second spring 121b2 and a third spring 121b3 arranged in series. The constant of spring of the first spring 121b1 is the smallest among the three springs and the constant of spring of the second spring 121b2 is larger than that of the first spring but smaller than that of the third spring 121b3. The first spring 121b1 is housed in the first case 121b4 with an extendible length of a predetermined distance S1 and when the first spring 121b1 extends by the length of the distance S1, further extension is restricted by the first case 121b4. The second spring 121b2 is similarly housed in the second case 121b5 with an extendible length of a predetermined distance S2 and when the second spring 121b2 extends by the length of the distance S2, further extension is restricted by the second case 121b5.

FIG. 19 (a) shows the condition that the first spring 121b1, the second spring 121b2 and the third spring 121b3 are in naturally extended length condition. When a force in an extending direction is applied on the reaction force spring 121b, the springs are beginning to extend in order of the spring with smaller constant of spring. As shown in FIG. 19(b), the extension of the first spring 121b1 is restricted by the first case 121b4 and the extension of the second spring 121b2 is restricted by the second case 121b5.

The reaction force of the brake pedal by the master cylinder pressure cannot be generated upon a non-emergency braking operation under the master cylinder 23 and the reservoir tank 24 being in communication with each other through the port (in the first embodiment, the first port 23h, in the third embodiment, the first port 23h, port 223b1 of the first piston side and port 223b2 of the second piston side). Further, in general, the depression force performance (F-S characteristics) relative to the depression amount (pedal stroke) of the brake pedal 21 is indicated as a non-linear performance line.

Figure 21:
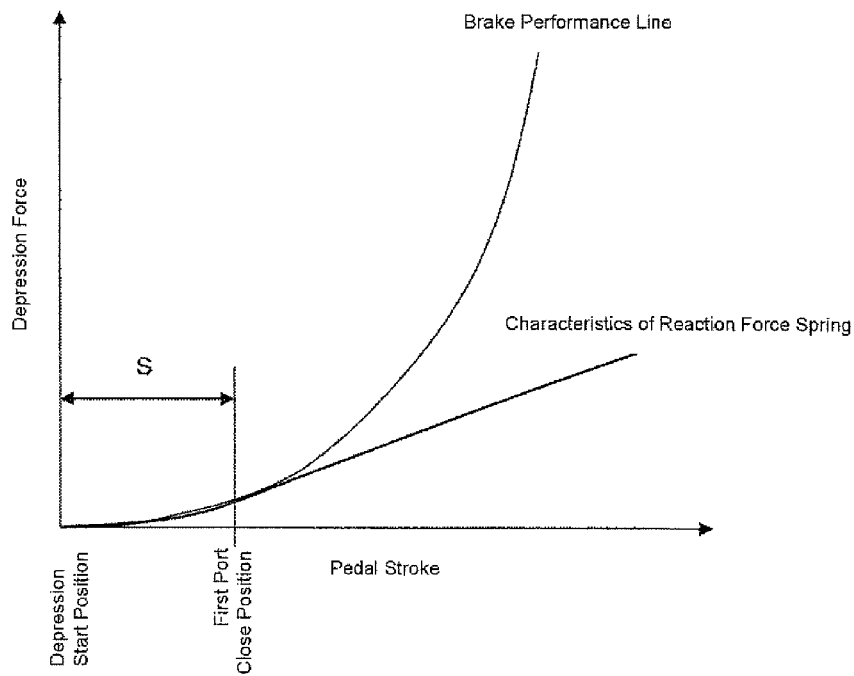
FIG. 21 is a graph showing the pedal stroke—depression force performance showing the reaction force spring operation according to the vehicle brake device of the seventh embodiment of the invention.

Accordingly, in the structure of the embodiment, the reaction force spring 121b is indicated with the bold solid line in FIG. 21 and under the master cylinder 23 and the reservoir tank 24 being in communication with each other through the first port 23h (or the port 123b1 for the piston and the first port 23h), in other words, while the pedal stroke being positioned from the depression start position to the position where the first port 23h is closed, the load characteristics relative to the deflection characteristics of the reaction force spring 121b is indicated as a non-linear performance line. Normal depression force characteristics (F-S characteristics) relative to the brake pedal depression amount (pedal stroke) is illustrated with a fine solid line. As shown in FIG. 21, the brake performance characteristic (F-S characteristics) is represented as a non-linear line. The spring performance characteristics of the reaction force spring of this embodiment is indicated as same characteristics as the normal brake performance characteristics from the depression start position to the closed position and is indicated as the linear performance line after the position moves beyond the closed position. A good brake feeling can be given to the operator of the vehicle from the position where the brake pedal is depressed to the position while the first piston 23b (or the first piston 123b) moves from the first position to the second position (while the brake pedal 21 is started to be depressed and moves by a predetermined distance S).

Figure 20:
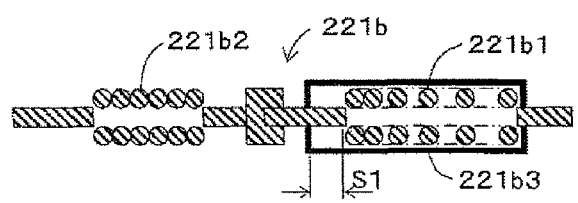
FIG. 20 (a) is a view showing another example of the reaction force spring of the vehicle brake device according to the seventh embodiment of the invention, showing the condition with naturally extended length and FIG. 20 (b) is similar to FIG. 20 (a), but showing the reaction force spring under the condition of extension.
Figure 20:
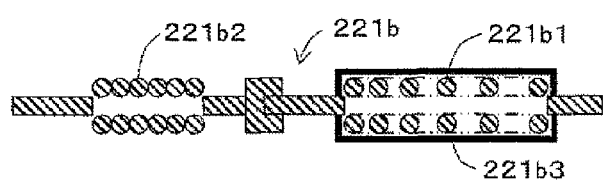

The reaction force spring 221b may be formed by combining a linear spring and a non-linear spring as shown in FIG. 20.

In more detail, the reaction force spring 221b is formed by connecting a first spring 221b1 which is a non-linear spring, a second spring 221b2 which is a linear spring arranged in series. The constant of spring of the first spring 221b1 is smaller than that of the second spring 221b2. The first spring 221b1 is housed in the first case 221b3 with an extendible length of a predetermined distance S1 and when the first spring 221b1 extends by the length of the distance S1, further extension is restricted by the first case 221b3.

FIG. 20 (a) shows the condition that the first spring 221b1 and the second spring 221b2 are in naturally extended length condition. When a force in an extending direction is applied on the reaction force spring 121b, the springs are beginning to extend from the first spring 221b1 with smaller constant of spring. As shown in FIG. 20 (b), the extension of the first spring 221b1 is restricted by the first case 121b3.

9) Eighth Embodiment

Figure 22:
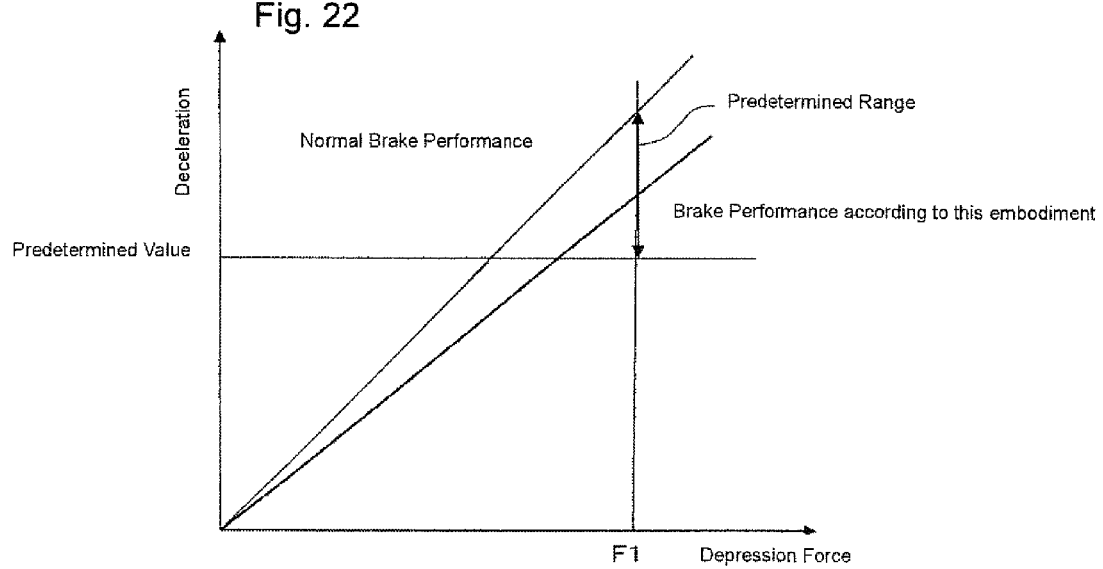
FIG. 22 is a graph showing the depression force—deceleration performance showing the reaction force spring operation according to the vehicle brake device of the eighth embodiment of the invention.

Next, the eighth embodiment of the vehicle brake device according to the invention adapted to the hybrid vehicle will be explained with reference to FIG. 22. According to this eight embodiment, the load characteristics relative to the deflection of the reaction force spring 21b indicate a linear performance line under the communication between the master cylinder 23 and the reservoir tank 24 being interrupted and the increase of load relative to the increase of deflection in the linear performance is equal to or less than the increase of the load relative to the increase of deflection in the non-linear performance.

Generally, it is desirable to obtain a predetermined deceleration range (for example 0.25 G or more) for a predetermined depression force F1 (for example 500N). It is noted that the depression force is the total force of the reaction force by the master cylinder and the biasing force of the reaction force spring.

Therefore, according to the reaction force spring 21b of this embodiment, the load characteristics relative to the deflection of the reaction force spring is set to be a linear performance line under the communication between the master cylinder and the reservoir tank being established and set to be non-linear performance line under the communication between the master cylinder and the reservoir tank being interrupted. Further, the increase of load relative to the increase of deflection under the linear performance line {normal braking performance (Depression—Deceleration performance line) as indicated with the fine solid line} is equal to or less than the increase of load relative to the increase of deflection under the non-linear performance line {braking performance according to the embodiment (Depression—Deceleration performance line) as indicated with the bold solid line}. Thus, by restricting the biasing force of the reaction force spring, the predetermined range deceleration relative to the predetermined depression force can be obtained.

The brake conduit system of each embodiment explained above is formed by a front/rear split type conduit system. However, a diagonal conduit system may be adapted to the conduit system for each embodiment.

Further, in each embodiment, after the brake operation condition being a predetermined condition, it may be applicable to control by selecting any of the larger one between the pedal stroke and the master cylinder pressure as the brake operation condition.

Further, the vacuum booster is adapted for the boosting device, a hydraulic booster which boosts the pedal depression force applied on the brake pedal 21 by the hydraulic pressure generated by a pump and accumulated in an accumulator and by applying the hydraulic pressure to a piston.

The invention can be applicable not only to a hybrid vehicle but also a vehicle with a motor as a single power source and installed with a vehicle brake device having a master cylinder with a vacuum booster. In this case, a vacuum pressure source is necessary.

APPLICABILITY FOR INDUSTRY

According to the vehicle brake device as explained, by positively utilizing the regenerative braking force high regeneration efficiency can be achieved upon a non-emergency braking operation and at the same time early supply of the basic hydraulic braking force as possible can be applied upon an emergency braking operation.

EXPLANATION OF REFERENCE NUMERALS

In the drawings:
11: engine, 12: motor, 13: power split mechanism, 14: power transmitting mechanism, 15: generator, 16: inverter, 17: battery, 18: engine ECU, 19: hybrid ECU, 21: brake pedal, 21a: brake pedal stroke sensor, 21b: reaction force spring, 22: vacuum booster, 23: master cylinder, 23a: housing, 23b, 23c: first and second pistons, 23d: first hydraulic chamber, 23e: first spring, 23f: second hydraulic chamber, 23g: second spring, 23h: first port, 23i: second port, 23j: third port, 23k: fourth port, 24: reservoir tank, 25: brake actuator, 26: operating rod, 26a: first operating rod (first rod), 26b: second operating rod (second rod), 27: push rod, 31, 41: hydraulic control valve, 32, 33, 42, 43: pressure increase control valve, 35, 36, 45, 46: pressure decrease control valve, 34, 4: pressure modulating reservoir, 37, 47: pump, 60: brake ECU, 70: operation force transmitting mechanism (connecting mechanism), 71: cylindrical portion, 72: cylindrical engaging portion, 73: spring, 74: communication passage, A: regeneration brake device, B: hydraulic brake device, BK1 to BK4: brake means, FL, FR, RL, RR: vehicle wheel, Lf, Lr: fluid passage, M: motor, P: pressure sensor, Sf, Sfr, Srl, Srr: vehicle wheel sensor, WC1 to WC4: wheel cylinder.

The invention claimed is:
1. A vehicle brake device comprising:
a hydraulic brake device for generating a basic hydraulic braking force corresponding to a basic hydraulic pressure at each vehicle wheel, by generating the basic hydraulic pressure in response to a brake pedal depression in a master cylinder and by directly supplying the generated basic hydraulic pressure to said each vehicle wheel connected to the master cylinder via a hydraulic passage in which a hydraulic control valve is disposed and
a regeneration brake device for generating a regenerative braking force at any of said each vehicle wheel, wherein
a vehicle braking force corresponding to a brake pedal operation condition based on the basic hydraulic braking force and the regenerative braking force by cooperation between the hydraulic brake device and the regeneration brake device, characterized in that the vehicle brake device includes:
a connecting mechanism for cooperatively connecting the brake pedal and the master cylinder and having a first rod connected to the brake pedal, a second rod connected to the master cylinder, and an inner space at a tip end portion of the first rod and filled with fluid, the second rod being slidably engaged with the tip end portion of the first rod by variably changing the volume of the inner space and a biasing member disposed between the first rod and the second rod and biasing the first and the second rods in a direction where the volume of the inner space increases, and
a communication passage for establishing communication between the inside and outside of the inner space wherein upon an emergency depression of the brake pedal, outflow of the fluid in the inner space is restricted and upon a non-emergency depression of the brake pedal, the outflow of the fluid in the inner space is not restricted and wherein,
the generation of the basic hydraulic braking force is restricted under a condition that the second rod is slidably moving relative to the first rod and the generation restriction of the basic hydraulic braking force is released under a condition that the second rod is slidably moving together with the first rod.

2. The vehicle brake device according to claim 1, wherein the communication passage is formed by an orifice.

3. The vehicle brake device according to claim 2, wherein the orifice is formed by a gap between the first rod and the second rod.

4. The vehicle brake device according to claim 1, wherein at least one of the tip end portions of the first and the second rods is formed with a cylindrical portion having a bottom at one end and an opening at a tip end thereof and the other of the tip end portions slidably moves within the cylindrical portion and wherein the inner space is formed inside of the cylindrical portion.

5. The vehicle brake device according to claim 4, wherein the communication passage is formed by the orifice which penetrates through a side wall of the cylindrical portion.

6. The vehicle brake device according to claim 4, wherein the generation of the basic hydraulic braking force is restricted by the slidable movement of the second rod relative to the first rod during a period of time from the time when the depression of the brake pedal starts until the time when the tip end portion in the cylindrical portion contacts with the bottom of the cylindrical portion upon the non-emergency depression of the brake pedal, and wherein
the generation restriction of the basic hydraulic braking force is released when the second rod pushes the first rod by means of the fluid which is compressed in the inner space after the depression of the brake pedal started and before the tip end portion in the cylindrical portion contacts with the bottom of the cylindrical portion upon the emergency depression of the brake pedal.

7. The vehicle brake device according to claim 4, wherein the depression position of the brake pedal where the tip end portion in the cylindrical portion contacts with the bottom of the cylindrical portion is set based on the maximum generative braking force that can be generated by the regeneration brake device.

8. The vehicle brake device according to claim 1, further comprising:
a control valve for opening or closing a fluid passage which is connected to the communication passage; and
a detecting means for detecting the emergency depression of the brake pedal wherein the control valve closes the communication passage when the detecting means detects the emergency depression and opens the communication passage when the detecting means does not detect the emergency depression.

9. The vehicle brake device according to claim 1, wherein the vehicle brake device is provided with a brake assisting device which is operated under a condition that the second rod being slidably moving together with the first rod upon emergency depression of the brake pedal.

10. A vehicle brake device comprising:
a hydraulic brake device for generating a basic hydraulic braking force corresponding to a basic hydraulic pressure at each vehicle wheel, by generating the basic hydraulic pressure in response to a brake pedal depression in a master cylinder and by directly supplying the generated basic hydraulic pressure to said each vehicle wheel connected to the master cylinder via a hydraulic passage in which a hydraulic control valve is disposed and
a regeneration brake device for generating a regenerative braking force at any of said each vehicle wheel, wherein
a vehicle braking force corresponding to a brake pedal operation condition based on the basic hydraulic braking force and the regenerative braking force by cooperation between the hydraulic brake device and the regeneration brake device, characterized in that the vehicle brake device includes:
a connecting mechanism connecting the brake pedal and the master cylinder, the connecting mechanism including a first rod connected to the brake pedal, a second rod connected to the master cylinder, an inner space at a tip end portion of the first rod that is filled with a fluid, the second rod being slidably engaged with the tip end portion of the first rod by variably changing the volume of the inner space, and a biasing member disposed between the first rod and the second rod and biasing the first rod and the second rod in a direction where the volume of the inner space increases, and
a communication passage configured to allow the fluid to outflow from the inner space of the connecting mechanism to a space external to the connecting mechanism, the communication passage being configured so that upon an emergency depression of the brake pedal, outflow of the fluid in the inner space is restricted and upon a non-emergency depression of the brake pedal, the outflow of the fluid in the inner space is not restricted, and
the generation of the basic hydraulic braking force is restricted under a condition that the second rod is slidably moving relative to the first rod, and the generation restriction of the basic hydraulic braking force is released under a condition that the second rod is slidably moving together with the first rod.

11. A vehicle brake device comprising:
a hydraulic brake device for generating a basic hydraulic braking force corresponding to a basic hydraulic pressure at each vehicle wheel, by generating the basic hydraulic pressure in response to a brake pedal depression in a master cylinder and by directly supplying the generated basic hydraulic pressure to said each vehicle wheel connected to the master cylinder via a hydraulic passage in which a hydraulic control valve is disposed and
a regeneration brake device for generating a regenerative braking force at any of said each vehicle wheel, wherein
a vehicle braking force corresponding to a brake pedal operation condition based on the basic hydraulic braking force and the regenerative braking force by cooperation between the hydraulic brake device and the regeneration brake device, characterized in that the vehicle brake device includes:
a connecting mechanism connecting the brake pedal and the master cylinder, the connecting mechanism including a first rod connected to the brake pedal, a second rod connected to the master cylinder, an inner space at a tip end portion of the first rod and filled with a fluid, the second rod being slidably engaged with the tip end portion of the first rod by variably changing the volume of the inner space, and a biasing member disposed between the first rod and the second rod and biasing the first and the second rods in a direction where the volume of the inner space increases, and
a communication passage establishing communication between the inside and outside of the inner space, the communication passage being configured so that upon an emergency depression of the brake pedal, outflow of the fluid in the inner space is restricted and upon a non-emergency depression of the brake pedal, the outflow of the fluid in the inner space is unrestricted, and wherein
the generation of the basic hydraulic braking force is restricted under a condition that the second rod is slidably moving relative to the first rod by virtue of the unrestricted outflow of the fluid in the inner space, and the generation restriction of the basic hydraulic braking force is released under a condition that the second rod is slidably moving together with the first rod by virtue of the restricted outflow of the fluid in the inner space.

* * * * *